United States Patent
Gensler et al.

(10) Patent No.: US 12,253,342 B1
(45) Date of Patent: Mar. 18, 2025

(54) IMPULSE CARTRIDGE CUP FOR SMART STORES COMMUNICATION INTERFACE SQUIB WITH ELECTRONICS

(71) Applicant: BAE Systems Information and Electronic Systems Integration Inc., Nashua, NH (US)

(72) Inventors: Jeffrey A. Gensler, Austin, TX (US); Christopher E. Kohl, Austin, TX (US)

(73) Assignee: BAE Systems Information and Electronic Systems Integration Inc., Nashua, NH (US)

(*) Notice: Subject to any disclaimer, the term of this patent is extended or adjusted under 35 U.S.C. 154(b) by 116 days.

(21) Appl. No.: 18/364,508

(22) Filed: Aug. 3, 2023

(51) Int. Cl.
| | |
|---|---|
| F42B 5/15 | (2006.01) |
| B64D 1/02 | (2006.01) |
| B64D 7/00 | (2006.01) |
| F41A 9/72 | (2006.01) |
| F41A 19/68 | (2006.01) |
| F41F 3/06 | (2006.01) |
| F41F 3/065 | (2006.01) |
| F41H 13/00 | (2006.01) |
| F42B 5/02 | (2006.01) |
| F42B 12/70 | (2006.01) |

(52) U.S. Cl.
CPC ............... *F42B 5/15* (2013.01); *B64D 1/02* (2013.01); *F41A 9/72* (2013.01); *F41A 19/68* (2013.01); *F41F 3/06* (2013.01); *F42B 5/02* (2013.01); *F42B 12/70* (2013.01); *B64D 7/00* (2013.01); *F41F 3/065* (2013.01); *F41H 13/00* (2013.01)

(58) Field of Classification Search
CPC .... F42B 5/02; F42B 5/03; F42B 5/035; F42B 5/08; F42B 5/15; F42B 5/145; F42B 12/46; F42B 12/48; F42B 12/70; F41H 13/00; F41A 9/72; F41A 19/68; F41F 3/06; F41F 3/065; F41F 7/00; B64D 1/02; B64D 7/00
USPC ........ 102/202.5, 202.9, 202.12, 202.14, 438, 102/489; 89/1.2, 1.51, 1.52, 1.54, 1.57
See application file for complete search history.

(56) References Cited

U.S. PATENT DOCUMENTS

| | | | |
|---|---|---|---|
| 4,019,421 A | * | 4/1977 | Strom ...................... F42B 4/26 89/1.51 |
| 4,135,455 A | * | 1/1979 | Wallace .................. F42B 5/035 102/505 |
| 4,313,379 A | | 2/1982 | Wallace |

(Continued)

FOREIGN PATENT DOCUMENTS

| | | | |
|---|---|---|---|
| GB | 2480354 | 11/2011 | |
| GB | 2482218 A | * 1/2012 | ............ F42B 33/001 |

(Continued)

*Primary Examiner* — James S Bergin
(74) *Attorney, Agent, or Firm* — Sand, Sebolt & Wernow LPA

(57) ABSTRACT

An impulse cartridge (IC) cup has at least one aperture defined in a cylindrical sidewall. The first aperture extends radially relative to a primary axis through the cylindrical sidewall from an inner surface to an outer surface. A first electrical connector is disposed in the first aperture. The first electrical connector is adapted to physically contact the impulse cartridge at a first location. The IC cup is adapted to be connected to a canister that houses a payload of a countermeasure defense system, wherein the payload is to be deployed in response to explosion of the impulse cartridge.

18 Claims, 14 Drawing Sheets

(56) References Cited

U.S. PATENT DOCUMENTS

| | | | |
|---|---|---|---|
| 4,586,439 A * | 5/1986 | Wrana | F42B 12/62 102/438 |
| 4,791,870 A * | 12/1988 | Simpson | C06D 3/00 102/357 |
| 5,411,225 A | 5/1995 | Lannon et al. | |
| 6,983,385 B2 | 1/2006 | German et al. | |
| 7,091,693 B2 | 8/2006 | Grunert et al. | |
| 7,158,843 B2 | 1/2007 | Smith | |
| 7,278,658 B2 | 10/2007 | Boucher et al. | |
| 7,299,427 B2 | 11/2007 | Settles | |
| 7,343,859 B2 | 3/2008 | Matsuda et al. | |
| 8,154,255 B2 | 4/2012 | Wang et al. | |
| 9,003,944 B2 | 4/2015 | Zätterqvist | |
| 9,169,015 B2 * | 10/2015 | Le Croller | F41A 9/72 |
| 9,689,928 B2 | 6/2017 | Bernardon | |
| 9,811,079 B2 | 11/2017 | Theiss | |
| 9,870,333 B1 | 1/2018 | Lam et al. | |
| 9,995,793 B2 | 6/2018 | Bernardon | |
| 10,001,351 B2 * | 6/2018 | Secco | F41J 2/02 |
| 10,140,238 B2 | 11/2018 | Mundt et al. | |
| 10,211,488 B2 | 2/2019 | Willgert et al. | |
| 10,409,756 B2 | 9/2019 | Zhao et al. | |
| 10,611,330 B2 | 4/2020 | Phillion et al. | |
| 10,697,742 B2 | 6/2020 | Dube et al. | |
| 11,558,056 B2 * | 1/2023 | Branch | H03K 19/173 |
| 11,901,893 B2 * | 2/2024 | Branch | G05B 19/042 |
| 2004/0064744 A1 | 4/2004 | German et al. | |
| 2014/0242420 A1 | 8/2014 | Schaffner et al. | |
| 2017/0327068 A1 | 11/2017 | Phillion et al. | |
| 2021/0404783 A1 | 12/2021 | Branch et al. | |
| 2022/0397360 A1 | 12/2022 | Plemons et al. | |

FOREIGN PATENT DOCUMENTS

| | | |
|---|---|---|
| GB | 2504632 | 2/2014 |
| GB | 2520810 | 6/2015 |
| WO | 2011010163 | 1/2011 |
| WO | 2011101692 | 8/2011 |
| WO | 2021262984 | 12/2021 |
| WO | 2023014569 | 2/2023 |

* cited by examiner

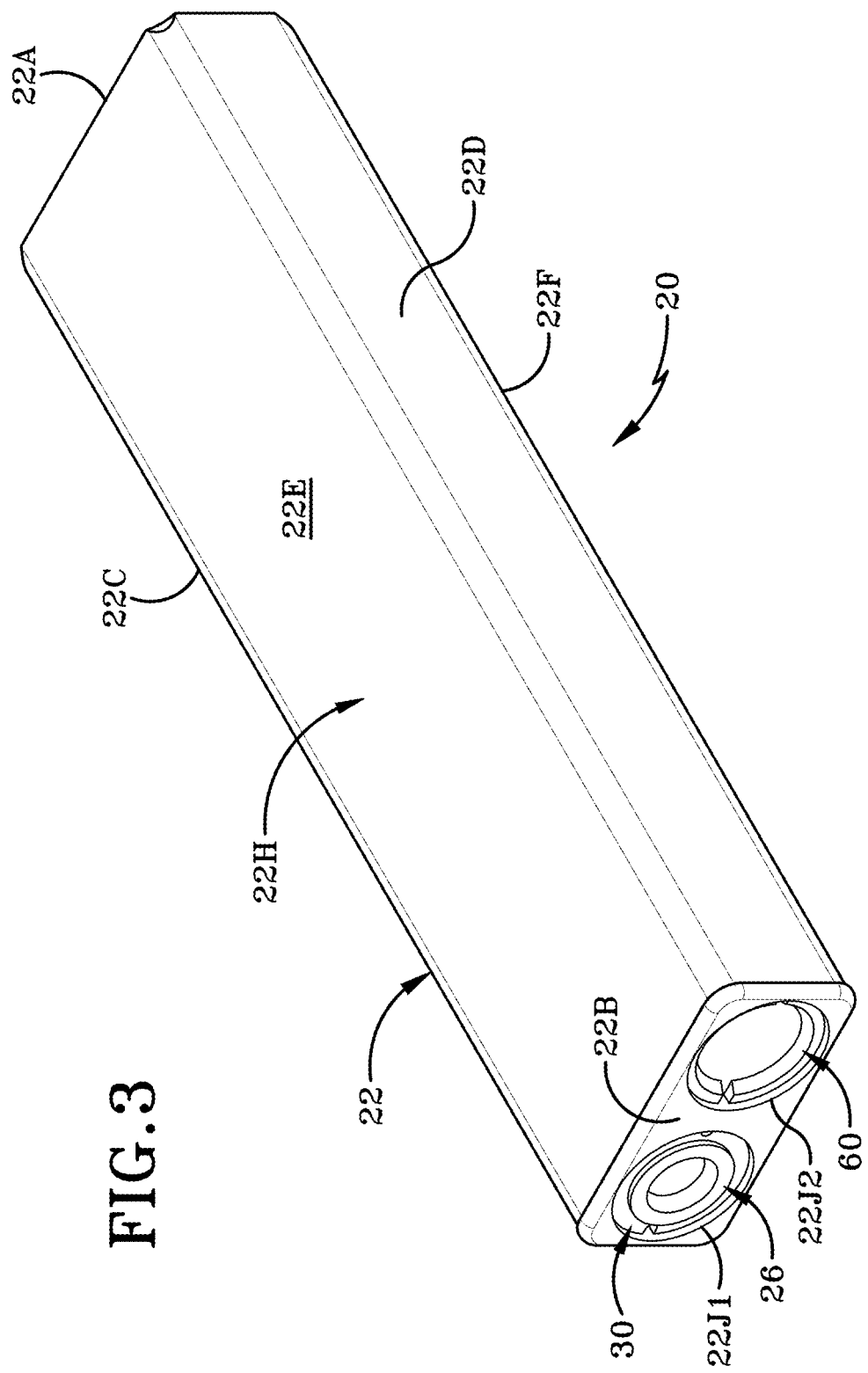

IMPULSE CARTRIDGE CUP FOR SMART STORES COMMUNICATION INTERFACE SQUIB WITH ELECTRONICS

STATEMENT OF GOVERNMENT INTEREST

This invention was made with government support under Prime Contract No. 14 D 0423/21 F 0005 awarded by a classified federal agency. The government has certain rights in the invention.

RELATED APPLICATIONS

Initially, it is noted that the present disclosure is related to the below listed U.S. Patent applications ("the Incorporated Applications"), filed on equal date herewith, the entirety of each of which is incorporated herein as if fully rewritten. The Incorporated Applications are:
1. U.S. patent application Ser. No. 18/364,514, entitled "COUNTERMEASURE EXPENDABLE HAVING A REMOVABLE PORT PLUG AND COUNTERMEASURE DISPENSER SYSTEM IMPLEMENTING THE SAME";
2. U.S. patent application Ser. No. 18/364,516, entitled "SMART PISTON";
3. U.S. patent application Ser. No. 18/364,522, entitled "SQUIB ENABLED HOLD UP BATTERY SWITCH";
4. U.S. patent application Ser. No. 18/364,527, entitled "MODULAR COMMON CONTROL CARD"; and
5. U.S. patent application Ser. No. 18/364,528, entitled "SMART STORE COMMUNICATION INTERFACE (SSCI) COMPATIBLE SQUIB DESIGN".

Since the present disclosure is related to the Incorporated Applications, some similar structural nomenclature is used herein when referencing some portions of the present disclosure relative to the Incorporated Applications. However, there may be some instances where structural nomenclature differs between similar elements and there may be other instances where nomenclature is similar between distinct elements relative to the present disclosure and the Incorporated Applications.

TECHNICAL FIELD

The present disclosure relates to smart technology provided inside of a countermeasure expendable for a countermeasure dispensing system (CMDS).

BACKGROUND ART

In current military technologies, military platforms, such as a military aircraft, include at least one countermeasure dispensing system (CMDS). The CMDS may eject one or more countermeasure expendables from the platform to dispense chaff material or flares away from the platform to counter a detected incoming threat, such as missiles or similar ballistic threats. Such dispensing of chaff material or flares away from the platform may then redirect the incoming threat away from the platform to leave the platform unscathed and/or unharmed. Each countermeasure dispenser in a CMDS is also electrically connected to a sequencer unit for ejecting the countermeasure expendables from the military platform. However, upon dispensing, these countermeasure expendables must dispense at suitable distances away from the military platform to ensure the incoming threat does not damage or destroy the military platform upon detonation of the incoming threat.

To combat these issues, conventional countermeasure expendables may include various technologies to ensure the countermeasure materials are dispensed at suitable distances away from the military platform to ensure the incoming threat does not damage or destroy the military platform upon detonation of the incoming threat. However, such countermeasure expendables use archaic and/or mechanical time delay devices (i.e., fuses and other similar time delays of the like) to ensure the countermeasure materials are dispensed at suitable distances away from the military platform. With such technology, testing and/or updating these countermeasure expendables may require extensive field testing that results in extensive labor and experimental costs.

SUMMARY OF THE INVENTION

In one aspect, an exemplary embodiment of the present disclosure may provide an impulse cartridge (IC) cup comprising: a body extending from a first end to a second end, the body having a primary axis extending from the first end to the second end; a cylindrical sidewall of the body extending between the first end and the second end, the cylindrical sidewall circumscribing the primary axis, the cylindrical sidewall having an outer surface and inner surface, wherein the inner surface defines a cavity that is adapted to receive an impulse cartridge therein, wherein at least a portion of the outer surface of the cylindrical sidewall is threaded; an endwall that defines the second end, wherein the endwall has an inner surface and an outer surface, wherein the inner surface of the endwall bounds the cavity, and the end wall intersects the primary axis, wherein the endwall is adapted to destructively open in response explosion of the impulse cartridge; a first aperture defined in the cylindrical sidewall, wherein the first aperture extends radially relative to the primary axis through the cylindrical sidewall from the inner surface to the outer surface; and a first electrical connector disposed in the first aperture, wherein the first electrical connector is adapted to physically contact the impulse cartridge at a first location; wherein the IC cup is adapted to be connected to a canister that houses a payload of a countermeasure defense system, wherein the payload is to be deployed in response to explosion of the impulse cartridge.

This exemplary embodiment or another exemplary embodiment may further include a first wire or transmission line coupled to the first electrical connector; and a common connector, wherein an end of the first wire or transmission line is connected to the common connector and the common connector is adapted to connect with a piston inside the canister.

This exemplary embodiment or another exemplary embodiment may further include a second aperture defined in the cylindrical sidewall, wherein the second opening extends radially relative to the primary axis through the cylindrical sidewall from the inner surface to the outer surface; and a second electrical connector disposed in the second aperture, wherein the second electrical connector is adapted to physically contact the impulse cartridge at a second location. This exemplary embodiment or another exemplary embodiment may provide that the second aperture and the third aperture are located closer to the endwall than the first end of the body.

This exemplary embodiment or another exemplary embodiment may further include a third aperture defined in the cylindrical sidewall, wherein the third aperture extends radially relative to the primary axis through the cylindrical sidewall from the inner surface to the outer surface; and a third electrical connector disposed in the third aperture, wherein the third electrical connector is adapted to physically contact the impulse cartridge at a third location.

This exemplary embodiment or another exemplary embodiment may further include a first wire or transmission line coupled to the first electrical connector; a second wire or transmission line coupled to the second electrical connector; and a third wire or transmission line coupled to the third electrical connector. This exemplary embodiment or another exemplary embodiment may further include a common connector, wherein respective ends of the first wire or transmission line, the second wire or transmission line, and the third wire or transmission line are connected to the common connector. This exemplary embodiment or another exemplary embodiment may provide that the first aperture is located closer to the first end than the second aperture. This exemplary embodiment or another exemplary embodiment may further include a first edge that bounds and defines the first aperture; a second edge that bounds and defines the second aperture; and a third edge that bounds and defines the third aperture; wherein the second edge and the third edge are coplanar along a first radial plane; wherein the first edge lies along a second radial plane, wherein the second radial plane is closer to the first end of the body than the first radial plane. This exemplary embodiment or another exemplary embodiment may further include a first gap defined between a first end of the first electrical connector; and a second gap defined between a second end of the first electrical connector.

This exemplary embodiment or another exemplary embodiment may further include a first channel defined in the outer surface of the body, wherein the first channel has a length that extends parallel to the primary axis, and the first channel begins adjacent the second end of the body and extends toward the first end and terminates at a terminal end; a second channel defined in the outer surface of the body, wherein the second channel has a length that extends parallel to the primary axis, and the second channel begins adjacent the second end of the body and extends toward the first end and terminates at a terminal end; and a third channel defined in the outer surface of the body, wherein the third channel has a length that extends parallel to the primary axis, and the third channel begins adjacent the second end of the body and extends toward the first end and terminates at a terminal end. This exemplary embodiment or another exemplary embodiment may provide that the first aperture is radially aligned with a portion of the first channel, the second aperture is radially aligned with a portion of the second channel, and the third aperture is radially aligned with a portion of the third channel. This exemplary embodiment or another exemplary embodiment may further include a first carrier board in the first channel, wherein the first electrical connector is connected to the first carrier board and disposed in the first aperture; a second carrier board in the second channel, wherein the second electrical connector is connected to the second carrier board and disposed in the second aperture; and a third carrier board in the third channel, wherein the third electrical connector is connected to the third carrier board and disposed in the third aperture. This exemplary embodiment or another exemplary embodiment may provide that the first channel is longer than the second channel and longer than the third channel. This exemplary embodiment or another exemplary embodiment may further include a depth of the first channel, wherein the depth of the first channel substantially equals a dimensional sum of a thickness of a first carrier in the first channel and a thickness of a layer of adhesive or epoxy to adhere or bond the first carrier in the first channel that is adapted to dispose an outer surface of the first carrier complementary to a nadir of at least one thread in the outer surface; a depth of the second channel, wherein the depth of the second channel substantially equals a dimensional sum of a thickness of a second carrier in the second channel and a thickness of a layer of adhesive or epoxy to adhere or bond the second carrier in the second channel that is adapted to dispose an outer surface of the second carrier complementary to a nadir of at least one thread in the outer surface; and a depth of the third channel, wherein the depth of the third channel substantially equals a dimensional sum of a thickness of a third carrier in the third channel and a thickness of a layer of adhesive or epoxy to adhere or bond the third carrier in the third channel that is adapted to dispose an outer surface of the third carrier complementary to a nadir of at least one thread in the outer surface.

This exemplary embodiment or another exemplary embodiment may provide that the first electrical connector is spaced about 120° relative to the primary axis from the second electrical connector, and wherein the second electrical connector is spaced about 120° relative to the primary axis from the third electrical connector, and wherein the third electrical connector is spaced about 120° relative to the primary axis from the first electrical connector.

This exemplary embodiment or another exemplary embodiment may provide that the first electrical connector is a bowlegged connector.

In another aspect, another exemplary embodiment of the present disclosure may provide a method comprising the steps of providing a payload housing adapted to retain a countermeasure payload therein, wherein the housing has a first end and a second end, wherein the countermeasure payload is to be configured to deployed from the first end; connecting an IC cup to the second end of the payload housing, wherein the IC cup includes: a body extending from a first end to a second end, the body having a primary axis extending from the first end to the second end; a cylindrical sidewall of the body extending between the first end and the second end, the cylindrical sidewall circumscribing the primary axis, the cylindrical sidewall having an outer surface and inner surface, wherein the inner surface defines a cavity that is adapted to receive an impulse cartridge therein, wherein at least a portion of the outer surface of the cylindrical sidewall is threaded; an endwall that defines the second end, wherein the endwall has an inner surface and an outer surface, wherein the inner surface of the endwall bounds the cavity, and the end wall intersects the primary axis, wherein the endwall is adapted to destructively open in response explosion of the impulse cartridge; a first aperture defined in the cylindrical sidewall, wherein the first aperture extends radially relative to the primary axis through the cylindrical sidewall from the inner surface to the outer surface; and a first electrical connector disposed in the first aperture, wherein the first electrical connector is adapted to physically contact the impulse cartridge at a first location; and performing one of the following steps: connecting an impulse cartridge or squib to the IC cup; or effecting the impulse cartridge or squib to be connected to the IC cup.

BRIEF DESCRIPTION OF THE DRAWINGS

Sample embodiments of the present disclosure are set forth in the following description, are shown in the drawings and are particularly and distinctly pointed out and set forth in the appended claims.

FIG. 3 is a top, rear, second side isometric perspective view of a countermeasure expendable of the set of countermeasure expendables.

Similar numbers refer to similar parts throughout the drawings.

DETAILED DESCRIPTION

Figure 1:
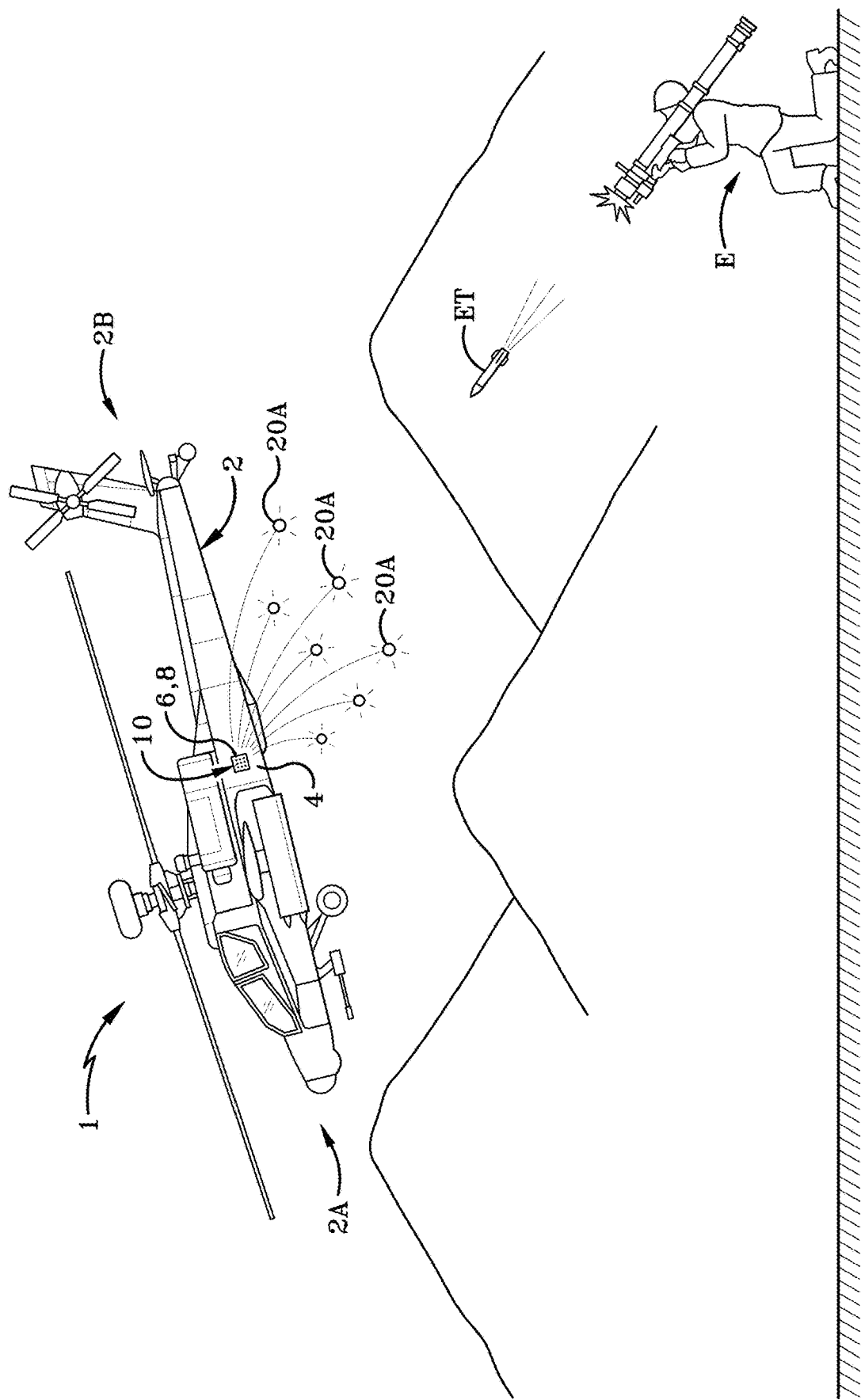
FIG. 1 is a diagrammatic view showing a platform having a CMDS, wherein CMDS is being used to deter an incoming enemy threat via countermeasure material.

FIG. 1 illustrates a platform 1 such as a vehicle, ship or aircraft, which may be manned or unmanned, that includes a main body 2. As used herein, aircraft refers to fixed or rotary wing aircraft as well as unmanned aerial vehicles (UAVs) and satellites. The main body 2 has a front end 2A and a rear end 2B longitudinally opposite to the front end 2A. It should be understood that the directions of "front," "rear," "top," "bottom," "right," and "left" are only used as a directional reference for the main body 2 and its associated components and/or parts described herein and illustrated in FIG. 1.

The platform 1 in this example is an aircraft and includes a sidewall 4 that extends longitudinally between the front end 2A of the main body 2 and the rear end 2B of the main body 2. The sidewall 4 defines an opening 6 that is disposed between the front and rear ends 2A, 2B of the main body 2 providing access to a chamber 8. The opening 6 and the chamber 8 defined by the sidewall 4 is sized and configured to receive a countermeasure dispensing system (hereinafter "CMDS") generally referred to as 10. CMDS 10 operably engages the sidewall 4 of the main body 2 to mechanically fix the CMDS 10 with the platform 1. As illustrated in FIG. 1, the CMDS 10 is in line with the sidewall 4 of the main body 2 such that the CMDS 10 is even or conformal with the mold line of the platform 1 for aerodynamic purposes. Upon mounting the CMDS 10, the CMDS 10 is electrically connected to a legacy wiring harness 12B that is provided in the platform 1 to provide power and communication to some or all electrical components in the CMDS 10, which is described in more detail below.

Prior to military operation or an aerial mission of the platform 1, the CMDS is pre-loaded with a set of countermeasure expendables 20. Each countermeasure expendable of the set of countermeasure expendables 20 is loaded with flare and/or chaff material 20A for countermeasure purposes. Expendables 20 may also include other countermeasure materials other than a flare or chaff. In addition, each countermeasure expendable of the set of countermeasure expendables 20 includes an impulse cartridge or squib for detonating and dispensing the countermeasure material 20A from the platform 1. During military operation, the countermeasure material 20A (e.g., flare and/or chaff material or other material) provides a distraction to an incoming enemy threat "ET", initiated by an enemy "E", where the incoming enemy threat "ET" is diverted to the flare and/or chaff material 20A while allowing the platform 1 to remain unscathed. During the military operation or the aerial mission, the platform 1 may receive a warning from an on-board electronic warfare (EW) system regarding the incoming enemy threat "ET" approaching the platform 1. Upon a determination made by the on-board EW system and/or an operator, the CMDS 10 dispenses a calculated amount of countermeasure expendables from the set of countermeasure expendables 20 that are disposed underneath, behind, or to the side of the platform 1. In addition, the CMDS 10 may also be provided along any suitable location of the platform 1 other than sidewall 4 of the main body 2. In one exemplary embodiment, a CMDS may be provided within a wing of an aircraft. In another exemplary embodiment, a CMDS may be provided in a fuselage or a pod disposed on an aircraft.

It should be understood that the CMDS 10 is logically powered and controlled by an on-board system. The system may include suitable devices and apparatuses that are operably engaged with one another to logically control and power the CMDSs (such as CMDS 10) described and illustrated herein. In the illustrated embodiments, CMDSs described and illustrated herein may be logically powered and controlled by a legacy on-board system retaining a majority of legacy devices and apparatuses that are operably engaged with and in communication with one another. Examples of legacy devices and apparatuses that may be provided in this system include, but not limited to, a cockpit interface, discrete components, serial buses, a programmer, and data links. In another instance, a CMDS described and illustrated herein may be logically powered and controlled by a new on-board system having new devices and apparatuses that are operably engaged with one another.

Moreover, it will be understood that the on-board system may also retain and use legacy components of legacy CMDSs currently available. In one instance, a CMDS described and illustrated herein may maintain a legacy dispenser along with a legacy wiring harness operably engaging the CMDS with the legacy on-board system. In another instance, a CMDS described and illustrated herein may only maintain a legacy wiring harness operably engaging the CMDS with the legacy on-board system. Furthermore, it will be understood that CMDSs described and illustrated herein may also use new components that are not legacy to an aircraft nor a legacy on-board system provided on the aircraft. Such use of legacy and/or new components of CMDSs are described in further details below.

Figure 2A:
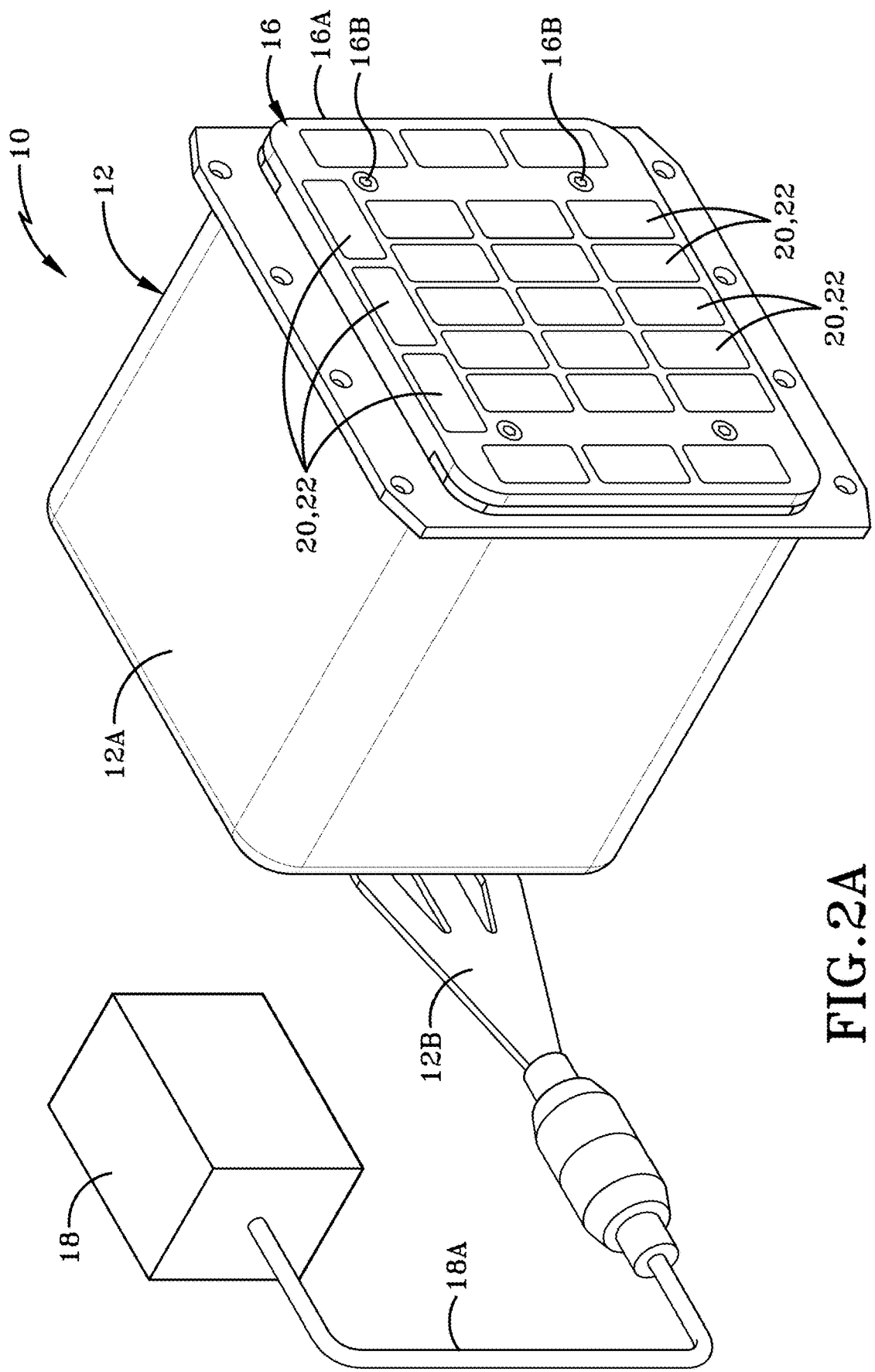
FIG. 2A is a top, front, first side isometric perspective view of CMDS illustrated in FIG. 1, wherein CMDS is loaded with a set of countermeasure expendables.
Figure 2B:
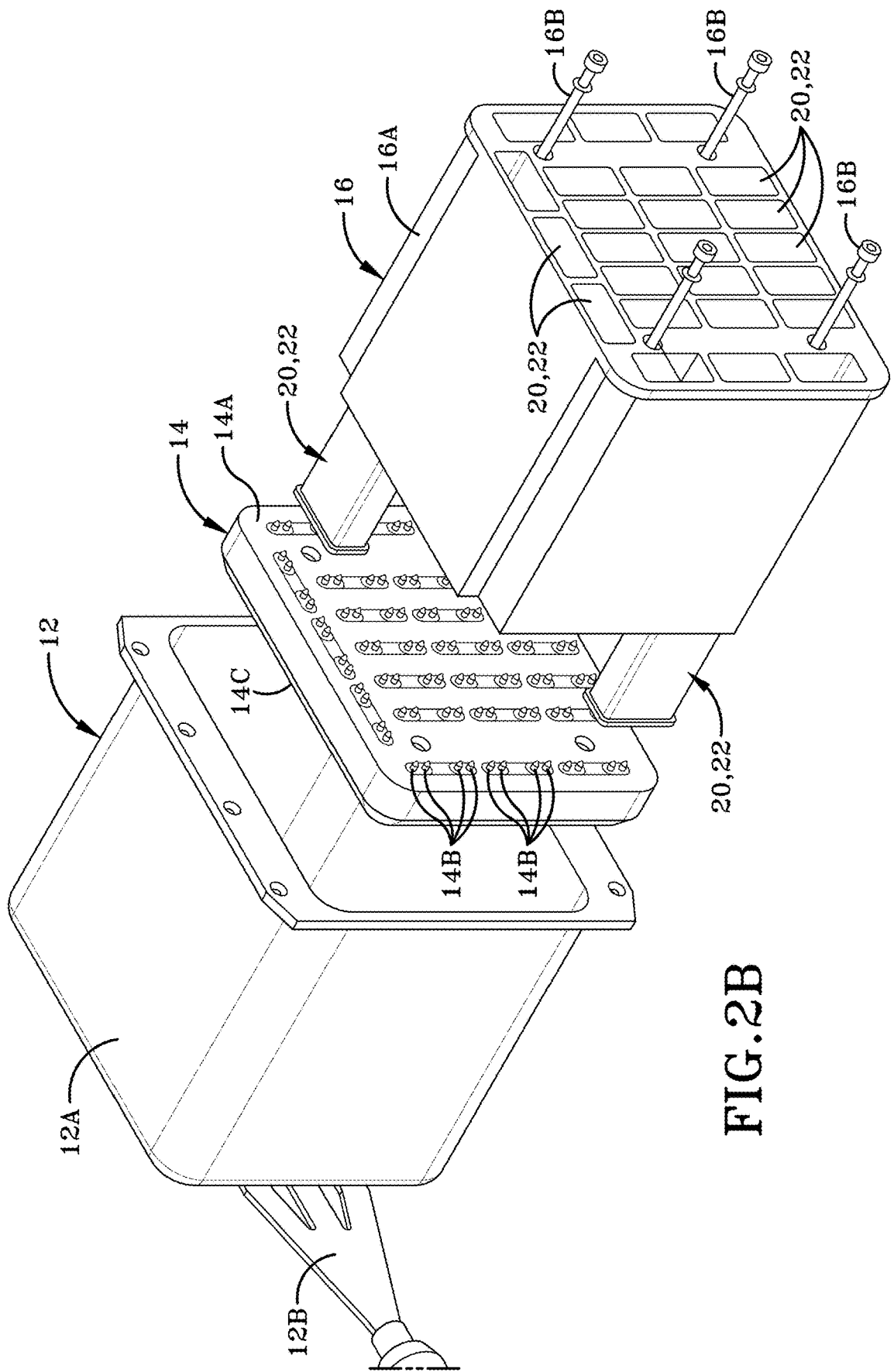
FIG. 2B is an exploded view of the CMDS and the set of countermeasure expendables.

CMDS 10 includes a dispenser assembly 12 that operably engages with the platform 1 inside of the chamber 5 defined in the sidewall 4. As best seen in FIG. 2B, a dispenser 12A of dispenser assembly 12 is configured to hold various assemblies, components, and parts of CMDS 10 inside of the platform 1 for countermeasure operations, which are described in greater detail below. While not illustrated herein, connectors or fasteners may operably engage the dispenser assembly 12 with the platform 1, via a flange of the dispenser 12A, for maintaining the CMDS 10 with the platform 1; such engagement of the dispenser assembly 12 with the platform 1 may be conventional means currently used in the art. In other exemplary embodiments, connectors described previously may be any suitable components that are configured to operably engage a dispenser assembly with a platform for maintaining a CMDS with the platform (e.g., fasteners and other similar components of the like). In one exemplary embodiment, dispenser assembly 12 may be a legacy AN/ALE-47 dispenser used in a standard AN/ALE-47 CMDS. In another exemplary embodiment, dispenser assembly 12 may be a new dispenser assembly that is configured to be used with a new CMDS currently available on platforms discussed herein.

Dispenser assembly 12 also includes a legacy wiring harness 12B that operably engages with the dispenser 12A. Wiring harness 12B is configured to provide an electrical connection between the dispenser 12A and a sequencer of CMDS 10 provided on the platform 1 to enable logic communication between each of the dispenser 12A and the sequencer for dispensing and/or ejecting expendables from the CMDS 10. Such dispensing and ejecting of countermeasure expendables from the CMDS 10 is described in greater detail below.

Referring to FIG. 2B, CMDS 10 also includes a breechplate assembly 14 that operably engages with the dispenser assembly 12, particularly with the dispenser of the dispenser assembly 12. Upon assembly, the entire breechplate assembly 14 is housed inside of the dispenser 12A and provides forty-eight firing lines as compared to the legacy thirty fires lines provided in legacy CMDS. Such parts and components of the breechplate assembly 14 are discussed in greater detail below.

Breechplate assembly 14 includes a faceplate 14A. As best seen in FIG. 2B, faceplate 14A operably engages with the dispenser 12A inside of the dispenser 12A. As described in greater detail below, faceplate 14A also operably engages with a magazine assembly of CMDS and each countermeasure expendable of the set of countermeasure expendables 20 once CMDS 10 is assembled and loaded into the platform 1.

Breechplate assembly 14 also includes a set of first pin mechanisms 14B that operably engages with the faceplate 14A. In the illustrated embodiment, the set of firing pin mechanisms 14B is configured to operably engage with a set of countermeasure expendables (e.g., the set of countermeasure expendables 20) once loaded into the CMDS 10, which is described in more detail below. The set of firing pin mechanisms 14B may be any suitable firing pin mechanisms 14B that are capable of initiating impulse cartridges to dispense countermeasure material from countermeasure expendables known in the art. In one exemplary embodiment, a set of firing pin mechanisms that may be used include firing pin mechanisms described and illustrated in U.S. patent application Ser. No. 17/345,551. In another exemplary embodiment, a set of firing pin mechanisms that may be used include firing pin mechanisms described and illustrated in U.S. patent application Ser. No. 18/045,194. Both of these applications are incorporated herein by reference. While not illustrated herein, the faceplate 14A may be configured to house any suitable electrical connections and/or electrical wiring that operably engages with each firing pin mechanism of the set of firing pin mechanisms 14B. In one exemplary embodiment, the faceplate 14A described and illustrated herein may define cavities and/or recesses to accommodate and/or house any suitable electrical connections and/or electrical wiring that operably engages with each firing pin mechanism of the set of firing pin mechanisms. In one embodiment, there are two pairs of firing pins of the set of firing pin mechanisms 14B may then engage with a respective countermeasure expendable from the set of countermeasure expendables 20. There may be a first pair of firing pins of the set of firing pin mechanisms 14B that operably engages with the squib 26, and a second pair of firing pins the set of firing pin mechanisms 14B operably engages with the port plug 60 of the respective countermeasure expendable from the set of countermeasure expendables 20. The remaining pairs of firing pins of the set of firing pin mechanisms 14B also engage with the remaining countermeasure expendables from the set of countermeasure expendables 20. One pin from the pair of firing pin mechanism contacts a corresponding fire pin on the squib 26 and the other pin from the pair contacts the conductive annular end of the squib 26 to create a grounded circuit (See FIG. 12B).

Breechplate assembly 14 may also include a rear cover plate 14C that operably engages with the faceplate 14A via connectors (not illustrated). In the illustrated embodiment, rear cover plate 14C is configured to cover and protect a rear surface of the faceplate 14A along with any electrical connections and/or wires that electrically connect to the set of firing pin mechanisms 14B. Upon assembly, the rear cover plate 14C also operably engages with the dispenser 12A inside of said dispenser 12A.

CMDS 10 also includes a magazine assembly 16 that operably engages with the dispenser assembly 12 and the breechplate assembly 14. As best seen in FIG. 2B, magazine assembly 16 is configured to be attached with the breechplate assembly 14 and hold the set of countermeasure expendables 20. Once assembled, the breechplate assembly 14 and the magazine assembly 16 are operably engaged with the dispenser 12A and housed inside of the dispenser 12A with the set of countermeasure expendables 20 loaded inside of the magazine assembly 16. Such components and parts that make up the magazine assembly 16 are described in more detail below.

Magazine assembly 16 includes a magazine 16A. As best seen in FIG. 2B, magazine 16A operably engages with the breechplate assembly 14 and is configured to hold the set of countermeasure expendables 20. More particularly, the magazine 16A operably engages with the faceplate 14A and houses each countermeasure expendables of the set of countermeasure expendables 20. Prior to operably engaging with the faceplate 14A, the set of countermeasure expendables 20 are loaded into the magazine 16A. Once assembled, the breechplate assembly 14 and the magazine assembly 16 operably engage with the dispenser 12A and are housed inside of the dispenser 12A with the plurality of countermeasure expendables 20 being loaded inside of the magazine 16A.

Magazine assembly 16 also includes a set of connectors 16B. As best seen in FIGS. 2A-2B, the set of connectors 16B operably engages the breechplate assembly 14 and the magazine 16A with the dispenser 12A. Upon assembly, a portion of the magazine 16A may protrude outwardly from the dispenser 12A. In one exemplary embodiment, the entire magazine 16A may be disposed inside of the dispenser 12A such that an exterior end or exterior surface of the magazine 16A is flush with a flange of the dispenser 12A upon assembly.

While not illustrated herein, CMDS 10 may include a controller assembly or an embedded fire select multiplexer assembly (EFSM) that operably engages with one or more of the dispenser assembly 12, the breechplate assembly 14, and the magazine assembly 16. If included, controller assembly may also be configured to electrically connect with each firing pin mechanism of the set of firing pin mechanisms 14B for expanding the number of countermeasure expendables from thirty countermeasure expendables in legacy CMDSs (e.g., AN/ALE-47 systems) up to forty-eight countermeasure expendables while using legacy hardware and components. In one example, controller assembly may be controller assembly described and illustrated in U.S. patent application Ser. No. 17/345,551 for expanding the number of countermeasure expendables from thirty countermeasure expendables in legacy CMDSs (e.g., AN/ALE-47 systems) up to forty-eight countermeasure expendables while using legacy hardware and components. In another example, controller assembly may be controller assembly described and illustrated in U.S. patent application Ser. No. 18/045,194 for expanding the number of countermeasure expendables from thirty countermeasure expendables in legacy CMDSs (e.g., AN/ALE-47 systems) up to forty-eight countermeasure expendables while using legacy hardware and components.

CMDS 10 may also include a sequencer 18. As best seen in FIG. 2A, sequencer 18 may electrically connect with the breechplate assembly 14 via the wiring harness 12B of dispenser assembly 12. More particularly, sequencer 18 may electrically connect with each firing pin of the set of firing pins 14B of breechplate assembly 14 via wiring harness 12B of dispenser assembly 12. It should be understood that sequencer 18 may be located at any suitable location on the platform 1 while still being able to electrically connect with the breechplate assembly 14 via the wiring harness 12B of dispenser assembly 12.

As discussed previously, CMDS 10 also includes the set of countermeasure expendables 20 that is loaded into the magazine 16A of magazine assembly 16 for countermeasure operations. Each countermeasure expendable of the set of countermeasure expendables 20 may include countermeasure material (e.g., chaff material, flare material, etc.) for deterring enemy threats away from the platform 1 during combat and/or military operations. Such parts and components of each countermeasure expendable of the set of countermeasure expendables 20 are discussed in greater detail below.

Each countermeasure expendable of the set of countermeasure expendable 20 includes a canister 22. As best seen in FIG. 3, canister 22 includes a front wall 22A, and rear wall 22B longitudinally opposite to the front wall 22A, and a longitudinal axis defined therebetween. Canister 22 also includes a first side wall 22C extending between the front wall 22A and the rear wall 22B, a second side wall 22D extending between the front wall 22A and the rear wall 22B and transversely opposite to the first side wall 22C, and a transverse axis defined therebetween. Canister 22 also includes a top wall 22E that is positioned vertically above the front wall 22A, the rear wall 22B, the first side wall 22C, and the second side wall 22D, a bottom wall 22F that is positioned vertically below the front wall 22A, the rear wall 22B, the first side wall 22C, and the second side wall 22D and vertically opposite to the top wall 22E, and a vertical axis defined therebetween.

Figure 5:
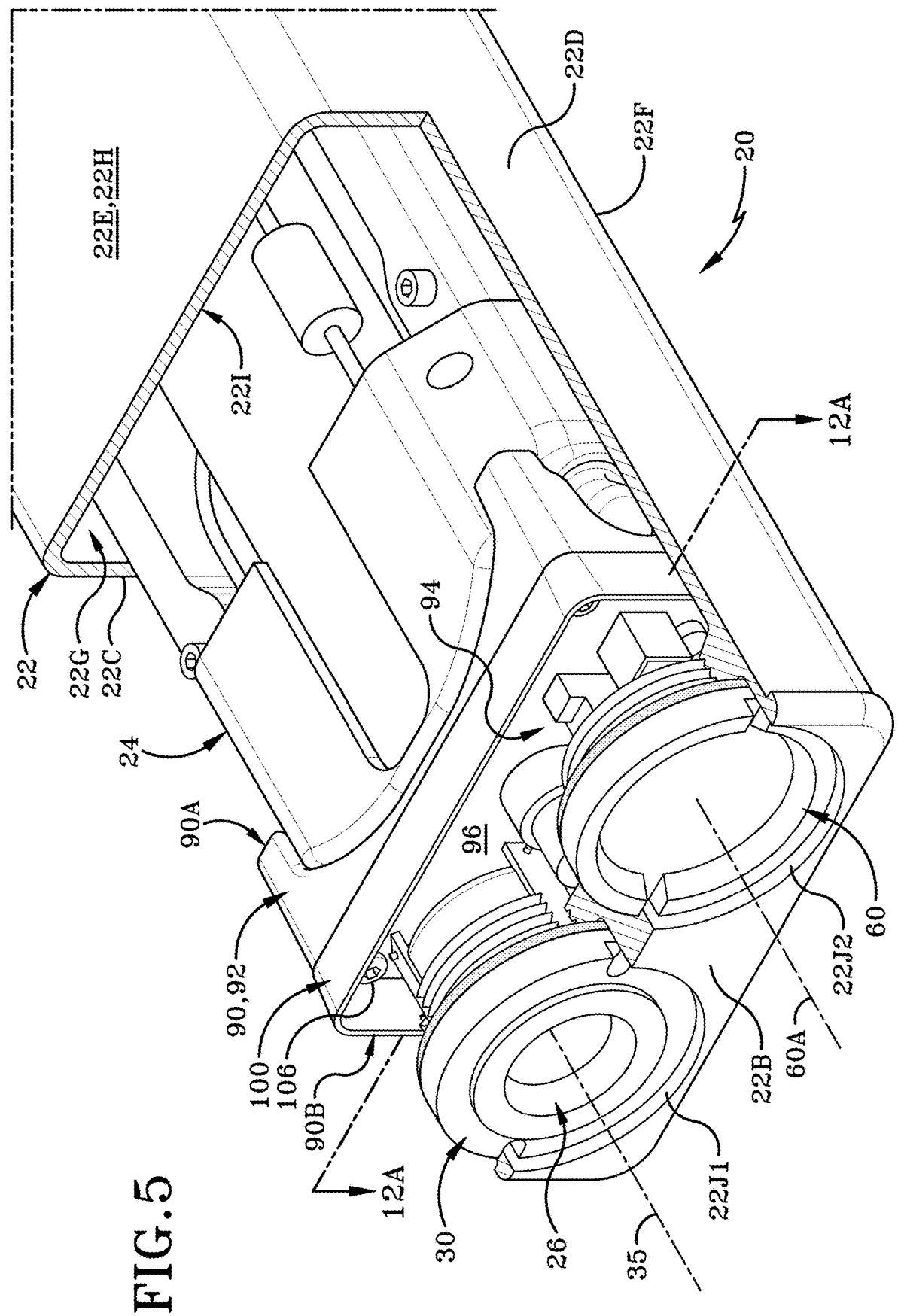
FIG. 5 is a rear cutaway view of a canister of the countermeasure expendable shown in FIG. 3.

Canister 22 also defines a chamber 22G. As best seen in FIG. 5, chamber 22G is collectively defined by the front wall 22A, the rear wall 22B, the first side wall 22C, the second side wall 22D, the top wall 22E, and the bottom wall 22F. Canister 22 also includes an exterior surface 22H that extends along each of the front wall 22A, the rear wall 22B, the first side wall 22C, the second side wall 22D, the top wall 22E, and the bottom wall 22F external to or outside of the chamber 22G. Canister 22 also includes an interior surface 22I that extends along each of the front wall 22A, the rear wall 22B, the first side wall 22C, the second side wall 22D, the top wall 22E, and the bottom wall 22F internal to or inside of the chamber 22G.

Figure 6:
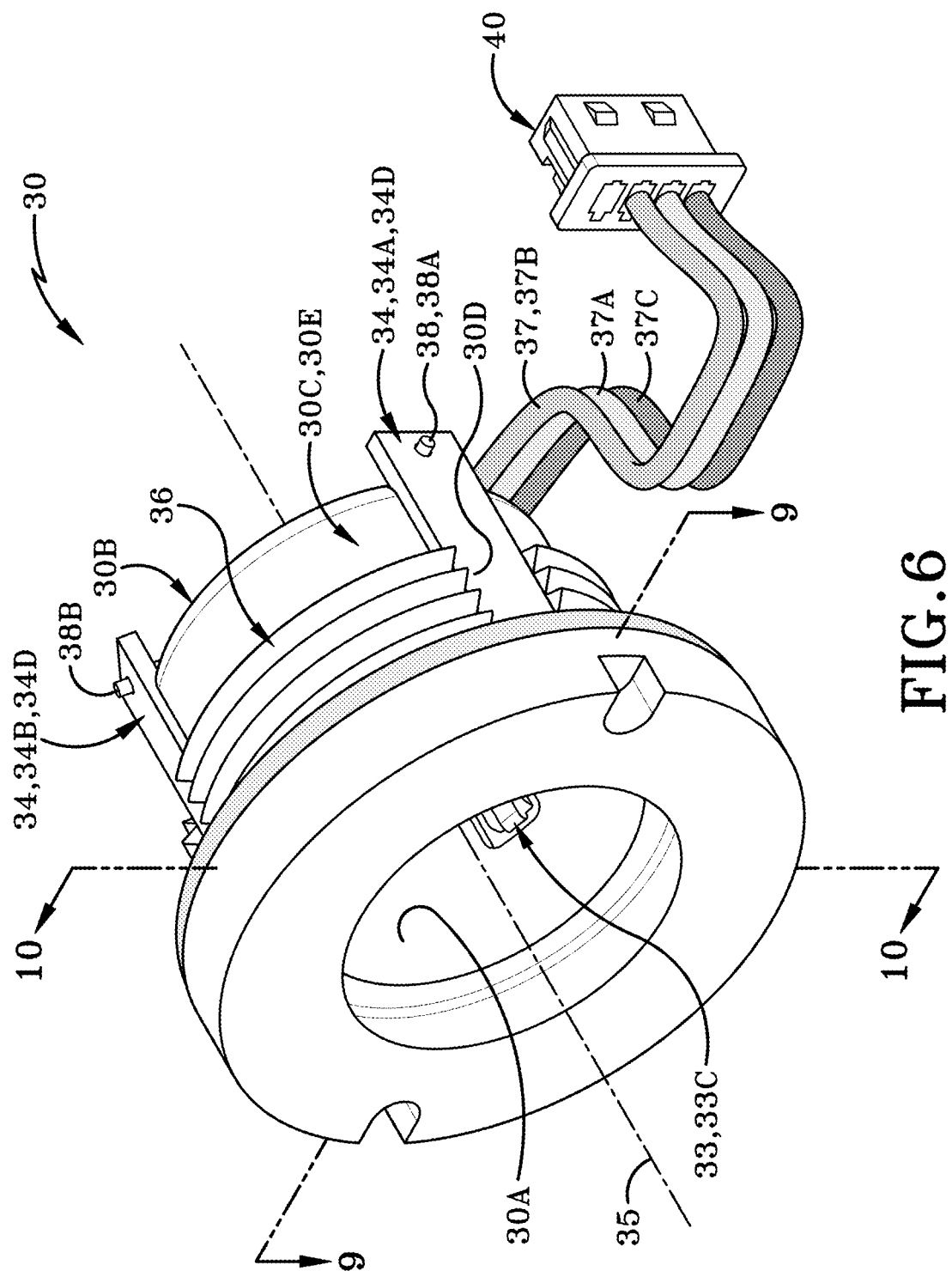
FIG. 6 is a front perspective view of an impulse cartridge cup according to an exemplary embodiment of the present disclosure.
Figure 7:
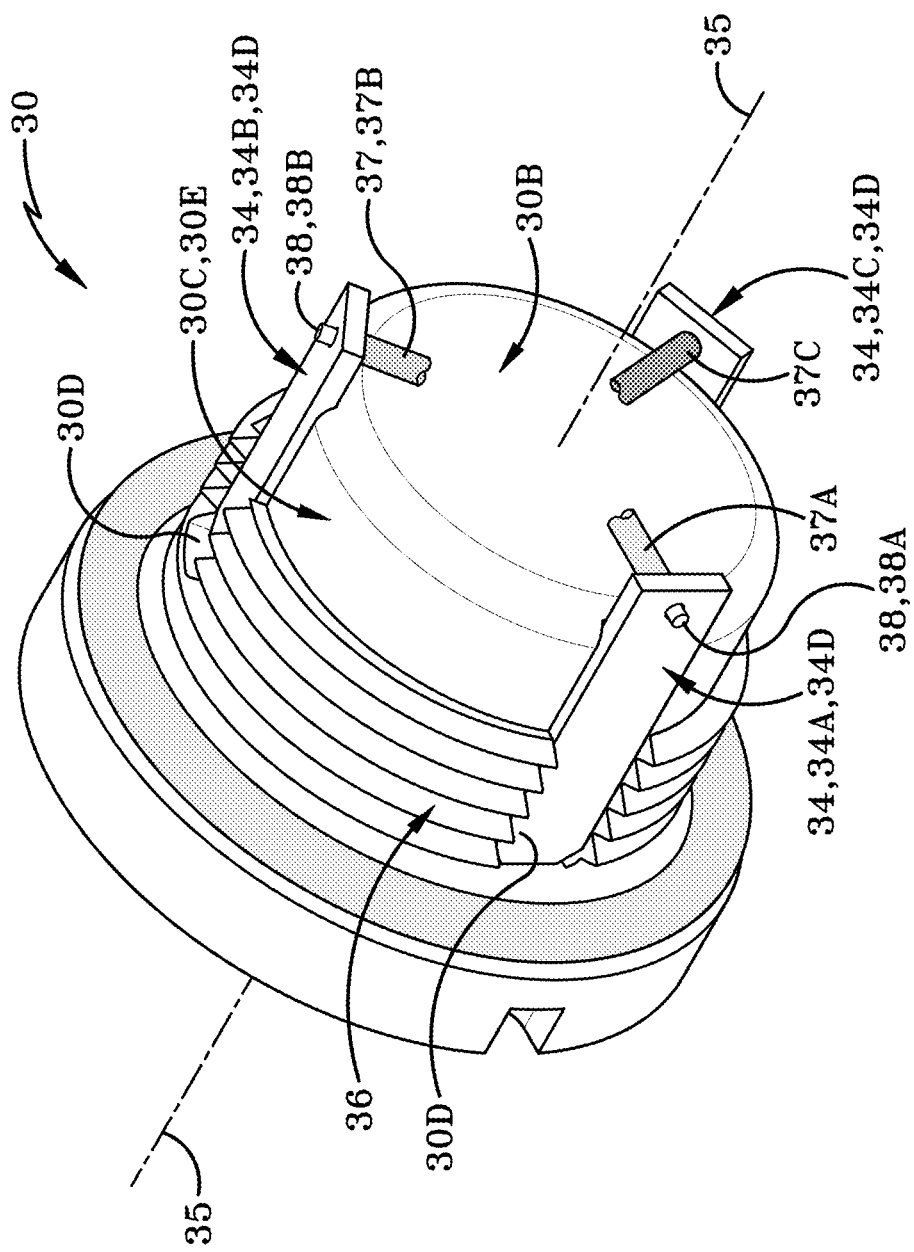
FIG. 7 is a rear perspective view of an impulse cartridge cup according to an exemplary embodiment of the present disclosure.

Canister 22 also defines at least one threaded opening 22J. As best seen in FIGS. 5-6, canister 22 defines a first threaded opening 22J1 that extends longitudinally from the rear wall 22B towards the front wall 22A. Canister 22 also defines a second threaded opening 22J2 that extends longitudinally from the rear wall 22B towards the front wall 22A. As best seen in FIG. 5, the first threaded opening 22J1 and the second threaded opening 22J2 are adjacent with one another and are transversely opposite one another relative to a longitudinal centerline. The first threaded opening 22J1 also provides open communication between the chamber 22G defined in canister 22 and the external environment surrounding the canister 22. Similarly, the second threaded opening 22J1 also provides open communication between the chamber 22G defined in canister 22 and the external environment surrounding the canister 22. Such uses of the first threaded opening 22J1 and the second threaded opening 22J2 are discussed in greater detail below.

Each countermeasure expendable of the set of countermeasure expendables 20 may also include a payload 24. As best seen in FIG. 5, payload 24 may be any suitable countermeasure material that, when ejected from canister 22, diverts or deters one or more enemy threats away from the platform 1. Payload 24 may also include a processing unit or microprocessor that is configured to eject and dispense the countermeasure material at a suitable distance away from the platform 1 dictated by the military operation.

Figure 4:
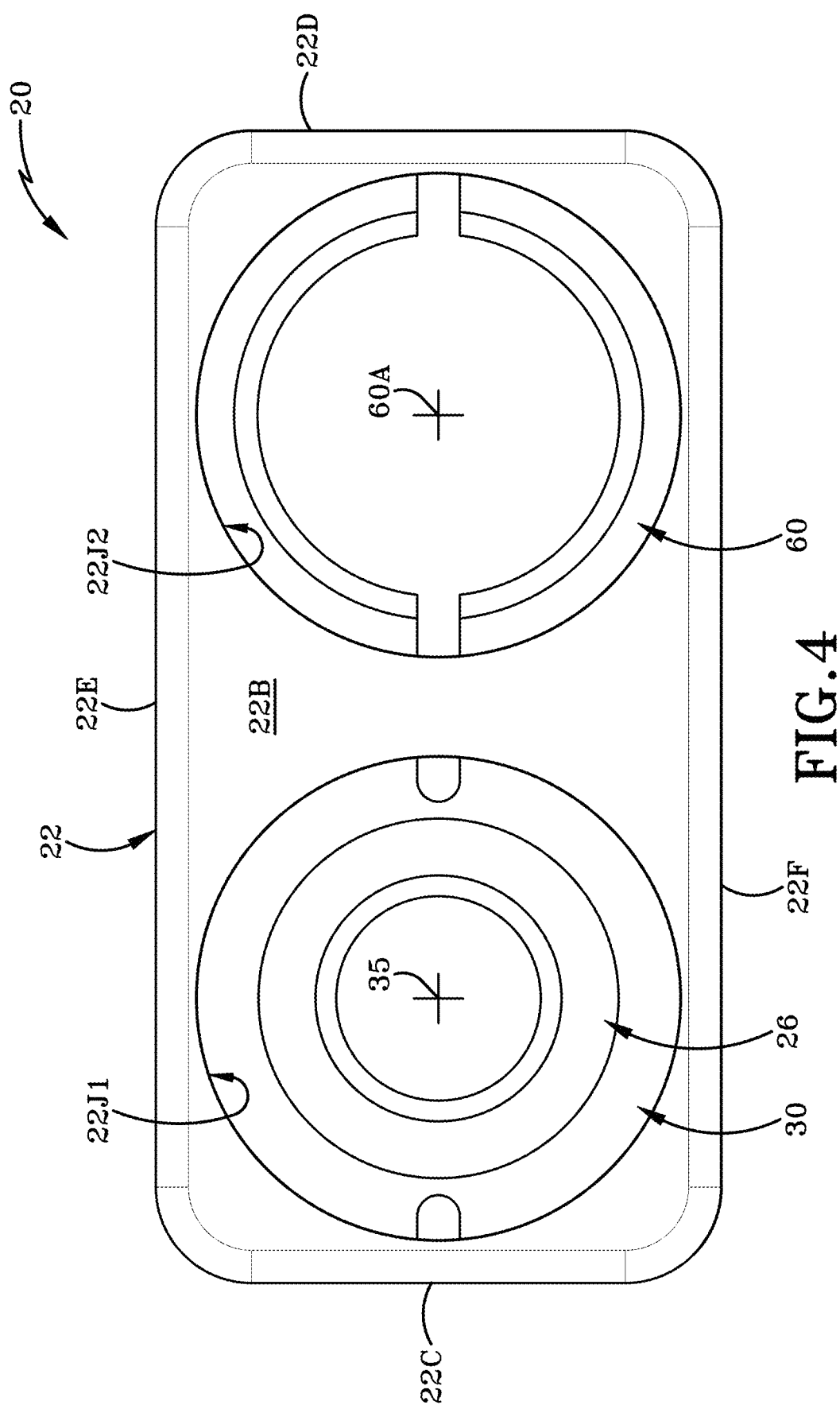
FIG. 4 is a rear elevation view of the countermeasure expendable shown in FIG. 3.

Each countermeasure expendable of the set of countermeasure expendables 20 may also include an impulse cartridge or squib 26. As best seen in FIGS. 4-5, squib 26 is configured to eject the payload 24 and other components of the countermeasure expendable 20 (discussed in greater detail below) from the canister 22 for dispensing countermeasure material at a suitable distance away from the platform 1 as dictated by the military operation.

Each countermeasure expendable of the set of countermeasure expendables 20 may also include an impulse cartridge cup 30. As best seen in FIG. 5, impulse cartridge cup 30 operably engages with the rear wall 22B of the canister 22. More particularly, impulse cartridge cup 30 may threadably engage with the rear wall 22B of the canister 22 via the first threaded opening 22J1. Upon engagement with canister 22, a portion of the impulse cartridge cup 30 is positioned inside of the canister 22 in which impulse cartridge cup 30 effectuates communication between the chamber 22G of canister 22 and the external environment of the canister 22 at the first threaded opening 22J1. Upon engagement with canister 22, a portion of impulse cartridge cup 30 is also partially positioned outside of chamber 22G of canister 22. As best seen in FIGS. 17A-17B, impulse cartridge cup 30 is configured to receive and house squib 26 for ejecting and dispensing the countermeasure material at a suitable distance away from the platform 1 dictated by the military operation. As discussed in greater detail below, impulse cartridge cup 30 may also be configured to send and/or output at least one signal to a smart piston of countermeasure expendable 20 upon engaging with squib 26.

The impulse cartridge (IC) cup 30 is a high precision cup that is shaped generally like a thimble that is configured to be connected to an end or rear wall 22B of canister 22 that stores a dispensable or expendable payload 24. The IC cup 30 has a body composed of a endwall 30B and a sidewall 30C that collectively define a cavity 30A that is configured to receive an impulse cartridge or squib 26 in order to fire or project the payload upon explosion of the squib/impulse cartridge. The cavity 30A may be plugged with a flexible gasket-type plug when the squib 26 is not inserted into the cavity 30A. The end or endwall 30B of the IC cup 30 is machined with purposeful perforations or destruction lines that purposely deteriorate or break in response to the explosion of the squib 26. The body of IC cup 30 extends from a first end to a second end that is defined by end wall 30B. The body of IC cup extends along a primary axis 35 from the first end to the second end. There may be an annular collar of the body at the first end, wherein the annular collar defines an opening adapted to receive an impulse cartridge (or squib 26) therethrough.

The cylindrical sidewall 30C of the body extends from the annular collar towards the second end. The cylindrical sidewall circumscribes the primary axis 35. The cylindrical sidewall 30C has an outer surface and inner surface, wherein a thickness of the sidewall is measured in a radial direction relative to the primary axis 35 between the outer surface and the inner surface, wherein the inner surface defines cavity 30A that is in open communication with the opening of the annular collar and adapted to receive the squib 26 therein. At least a portion of the outer surface of the cylindrical sidewall 30C is threaded, as evidenced by threads 36.

The IC cup 30 of the present disclosure enables signals to be sent through the IC cup 30 without disrupting the high precision burst plate or end wall 30B that has the purposefully constructed weakened lines or perforations. Stated otherwise, the weakened lines, which also may be referred to as score lines, are highly regulated and precisely machined to ensure that constant pressure is applied into the cavity of the payload upon explosion of the squib 26. Therefore, the IC cup 30 of the present disclosure enables signals to be sent through the IC cup 30 by constructing or defining a plurality of apertures 32 or through holes or openings that are defined in the sidewall 30C of the IC cup 30 and extend fully through the sidewall 30C from its inner surface to its exterior or outer surface 30E. This eliminates the need for any wires or electrical signal transmission paths to pass through the end wall 30B because of the high precision required for the weakened lines to burst at a precise pressure.

Figure 8:
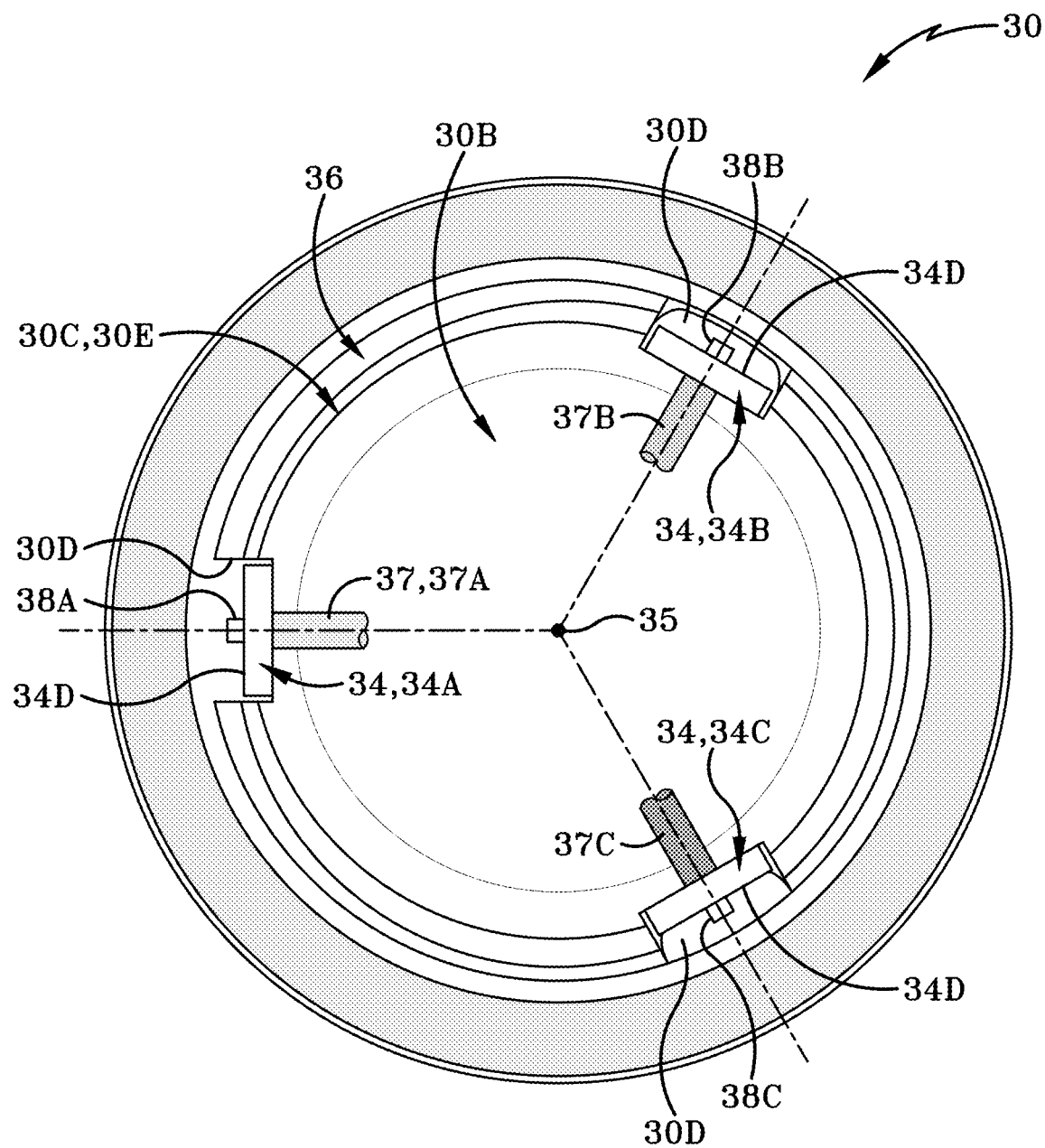
FIG. 8 is a rear end elevation view of an impulse cartridge cup according to an exemplary embodiment of the present disclosure.

In one specific example, there are at least three electrical connectors 33 carried by IC cup 30. In order for electrical connectors 33 to be disposed through the sidewall 30C of the IC cup 30, the exterior surface of sidewall 30C of IC cup 30 may be machined, drilled, or otherwise cut away to create a channel or kerf 30D that receives a carrier board 34 to dispose an electrical connector 33 within an aperture 32 that is in open communication with the cavity 30A of IC cup 30. More particularly, a first carrier board 34A carriers a first electrical connector 33A, a second carrier board 34B carriers a second electrical connector 33B, and a third carrier board 34C carriers a third electrical connector 33C. As depicted in FIG. 8, one exemplary embodiment may provide that each carrier board that carries one electrical connector 33 is offset 120° from an adjacent electrical connector relative to a central primary axis 35.

Each channel 30D on the exterior surface 30E of the IC cup 30 allows each carrier board 34 to be disposed below the exterior threads 36 formed in the outer surface 30E. For example, the lowermost surface of thread 36 relative to a central primary axis 35, which may be considered the nadir or valley 36A of each thread is located slightly above or coplanar with an exterior surface 34D of each carrier board 34 so as to allow the threads 36 to still operate to connect with corresponding threads on the first threaded opening 22J1 of canister 22 without having any interference by the carrier board 34. Furthermore, the peaks of the threads on the first opening 22J1 will contact the exterior surface 34D of the carrier board 34 to assist with retaining the carrier board 34 in position when an explosion or pressure occurrence happens to ensure that the electrical components or connectors 33 carried by each carrier board 34 stay connected to the squib 26 or impulse cartridge that is retained in the IC cup 30.

In one particular embodiment, each electrical connector 33 is a bowlegged spring connector. A typical bowlegged spring connector is a small component typically on the order of about 0.04 inches in width. In other embodiments, a different electrical connector may be utilized. The manner in which the electrical connector 33 is connected to the carrier board 34 may be accomplished through a re-flow connection technique. Hand soldering is likely not possible given the small size of the electrical connector 33, however might be possible if enough precision can be achieved so as to not create an electrical connection between the solder and the sidewall 30C of IC cup 30. Each electrical connector is disposed within one of the aperture 32 formed in the sidewall 30C of the IC cup 30 but does not touch the sidewall of the IC cup 30. As such, there is a gap 32A between the first end of the electrical connector 33 and the sidewall 30C of the IC cup 30 and there is a gap 32B between the second end of the electrical connector 33 and the sidewall 30C of the IC cup 30. In one particular embodiment, the two gaps 32A, 32B ensure that the electrical connector does not short out or ground to the body or sidewall of the IC cup 30.

A depth of a first channel 30D substantially equals or approximates a dimensional sum of a thickness of the first carrier board 34A in the first channel and a thickness of a layer of adhesive or epoxy to adhere or bond the first carrier board 34A in the first channel that is adapted to dispose an outer surface of the first carrier board 34D complementary to a nadir 36A of at least one thread 36 in the outer surface of sidewall 30C. A depth of the second channel substantially equals or approximates a dimensional sum of a thickness of a second carrier board 34B in the second channel and a thickness of a layer of adhesive or epoxy to adhere or bond the second carrier board 34B in the second channel that is adapted to dispose an outer surface of the second carrier board 34B complementary to the nadir 36A of at least one thread 36 in the outer surface of sidewall 30C. A depth of the third channel substantially equals or approximates a dimensional sum of a thickness of a third carrier board 34C in the third channel and a thickness of a layer of adhesive or epoxy to adhere or bond the third carrier board 34C in the third channel that is adapted to dispose an outer surface of the third carrier board complementary to the nadir 36A of at least one thread 36 in the outer surface of sidewall 30C.

Figure 9:
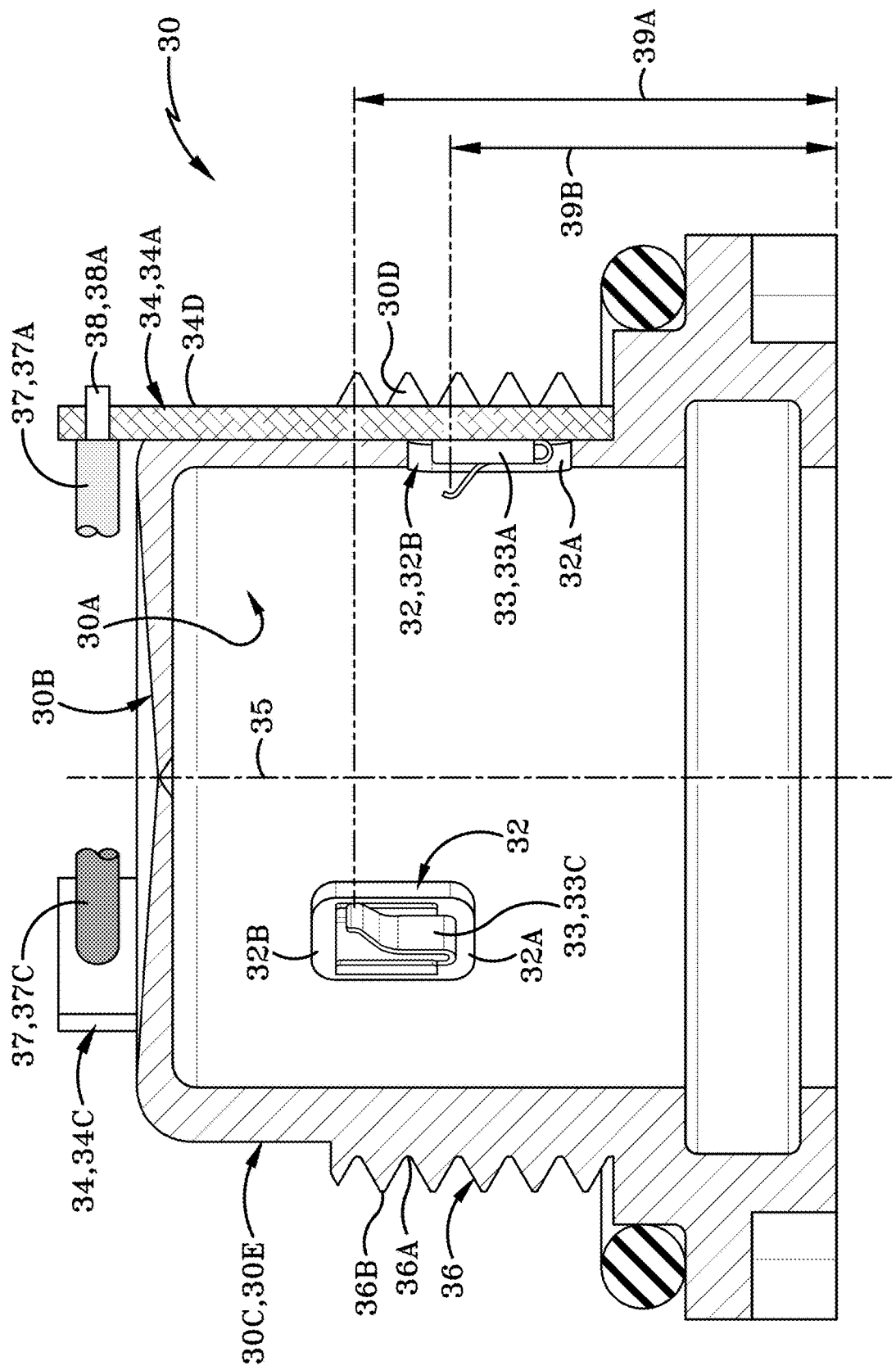
FIG. 9 is a cross section view of the impulse cartridge cup taken along line 9-9 in FIG. 6.
Figure 10:
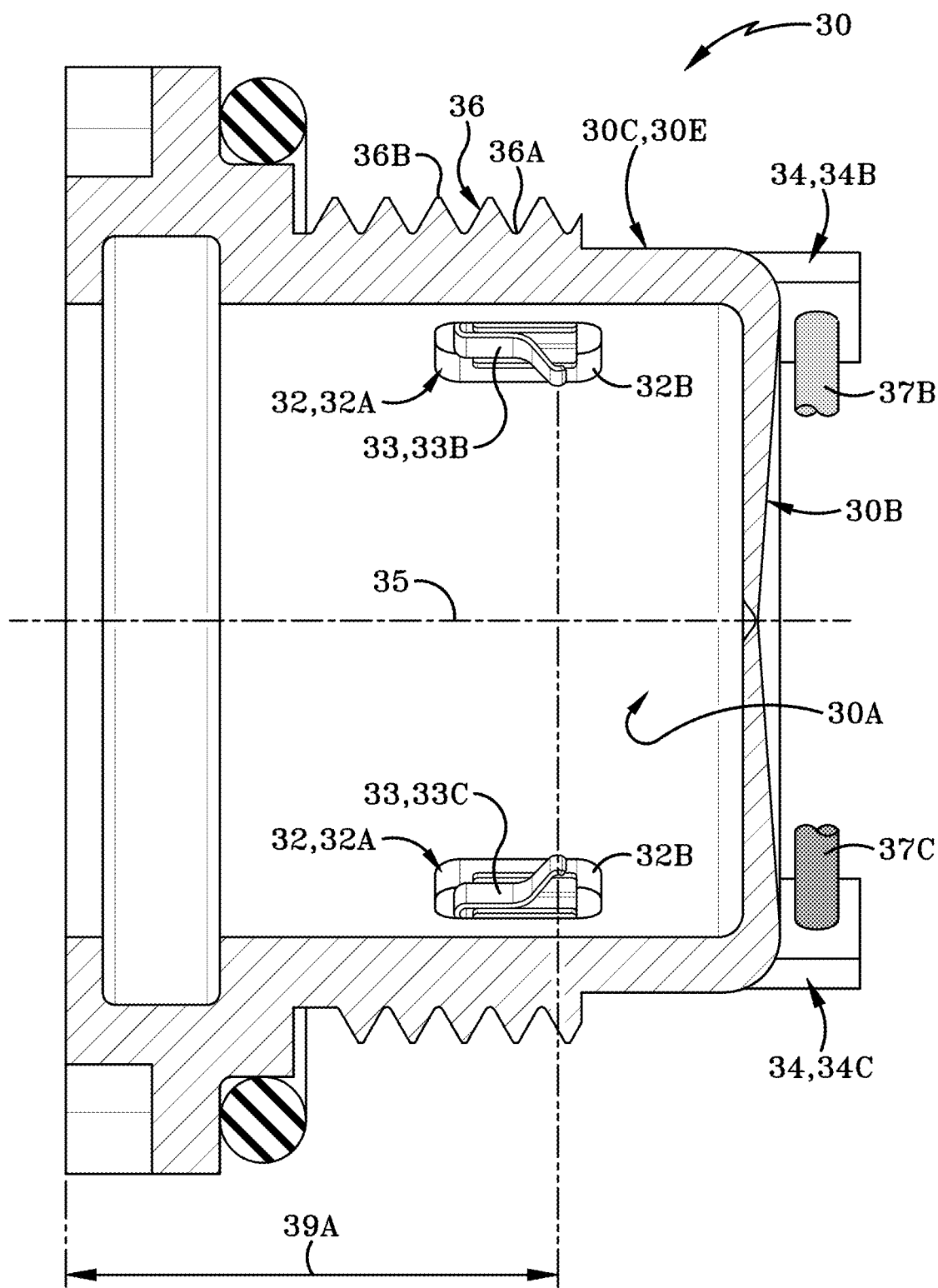
FIG. 10 is a cross section view of the impulse cartridge cup taken along line 10-10 in FIG. 6.

Each carrier board 34 has an end that extends from the IC cup 30. Each end is coupled with a respective wire 37 that is connected with a common connector, which is generally referred to as connector 40, to a port on the back of the piston assembly or piston 90. The wire 37A connected to the carrier board 34A via pin 38A carries the serial communication signals to the connector 40 for transmission into the payload 24. The carrier board 34A carrying the electrical connector 33A for the serial communication signal is longer than the other two carrier boards 34B, 34C because the longer board needs to enable the electrical connector 33A for communication signals to contact the electrically conductive annular ring on the smart squib while the other two shorter carrier boards 34B, 34C allow for the other two electrical connectors 33B, 33C to ground or otherwise short to the squib body via wires 37B, 37C, respectively. Thus, relative to the longitudinal length of the cylindrical sidewall 30C of the IC cup 30, two of the electrical connectors 33B, 33C are at the same longitudinal position, as depicted by dimension 39A, and the first electrical connector 33A or at least one other electrical connector is at a different position, as depicted by dimension 39B, relative to the longitudinal length of the IC cup 30. Dimension 39B is smaller than dimension 39A when measured relative to the opening to the cavity 30A (see FIG. 9). More particularly, a first opening or aperture edge bounds and defines the first opening or aperture. A second opening or aperture edge bounds and defines the second opening or aperture. A third opening or aperture edge bounds and defines the third opening. The second opening edge and the third opening edge are coplanar along a first radial plane, as evidenced by dimension 39A, and the first opening edge lies along a second radial plane, wherein the second radial plane is closer to the first end of the body than the first radial plane, as evidenced by dimension 39B.

With respect to the wires 37, the first wire 37A is the serial communication wire. The second wire 37B is the ground wire. The third wire 37C is the enable wire, which effectively provides communication to an enable pin on piston 90, wherein the enable pin is in electrical communication with the processor of the payload 24. Thus, whenever a squib 26 is plugged in to the IC cup 30 of the present disclosure, the second electrical connector 33B shorts out the third electrical connector 33C by both touching the case or housing of squib 26 simultaneously. This electrical short is accomplished because the case or body of squib 26 is conductive and thereby connects the second wire 37B to the third wire 37C to effectively short out to enable the small battery or coin cell battery 202 that enables the microprocessor to start functioning with the payload 24, and the signals that are enabled to be activated are transmitted through the serial communication wire 37A associated with the first connector 33A contacting the outer annular ring of the smart squib or smart impulse cartridge.

The IC cup 30 of the present disclosure is configured to be used with any type of impulse cartridge or squib 26. One exemplary squib 26 is a smart squib or smart impulse cartridge. Although the IC cup 30 of the present disclosure has been discussed herein with respect to a smart impulse cartridge or smart squib, the IC cup of the present disclosure can be utilized with a conventional or "dumb" squib that does not have any electrical communications there through. When using a conventional squib, the conventional squib will be inserted into the cavity of the IC cup 30 of the present disclosure (after removing the plug) and all three electrical contacts or connectors 33A, 33B, and 33C will contact the exterior surface of the conventional squib and short out. Thus, when they short and ground to each other, it will activate the payload 24 inside the canister 22 or cartridge case or housing. This allows the IC cup 30 of the present disclosure to be backwards compatible with previous legacy conventional squibs in conjunction with future developed smart squibs.

Each countermeasure expendable of the set of countermeasure expendables 20 may also include a port plug 60. As best seen in FIG. 5, port plug 60 operably engages with the rear wall 22B of the canister 22. More particularly, port plug 60 may threadably engage with the rear wall 22B of the canister 22 via the second threaded opening 22J2. Upon engagement with canister 22, port plug 60 is positioned entirely inside of the canister 22 in which port plug 60 impedes communication between the chamber 22G of canister 22 and the external environment of the canister 22 at the second threaded opening 22J2. Upon engagement with canister 22, port plug 60 is also partially positioned inside of chamber 22G of canister 22. During operation, port plug 60 may be removed and/or threadably disengaged from the second threaded opening 22J2 for testing operations, which are discussed in greater detail below.

Each countermeasure expendable of the set of countermeasure expendables 20 may also include a smart piston 90. As best seen in FIGS. 5-6, smart piston 90 includes a main body 92 that operably engages with the canister 22 forwardly of the rear wall 22B, the impulse cartridge cup 30, and the port plug 60. More particularly, smart piston 90 operably engages with the first side surface 22C, the second side surface 22D, the top wall 22E, and the bottom wall 22F inside of the chamber 22G along the interior surface 22I. As discussed in greater detail below, smart piston 90 enables one or more electrical signals to be passed between the payload 24 and the impulse cartridge cup 30 during testing operations and firing operations. Such parts and components of smart piston 90 are described in greater detail below.

Having now described the components of a countermeasure expendable of the set of countermeasure expendables 20, a method of firing at least one countermeasure expendable of the set of countermeasure expendables 20 from the platform 1 is discussed in greater detail below.

Prior to a military operation with platform 1, an operator of the CMDS 10 may begin to load the breechplate assembly 14 and the magazine assembly 16 into dispenser 12A of dispenser assembly 12. First, the operator may initially load the breechplate assembly 14 into dispenser 12A of dispenser assembly 12. Once inside of the dispenser 12A, the operator may then operably engage then electrically connect the breechplate assembly 14 with the dispenser assembly 12. In this step, a controller assembly (if included) may also be electrically connected with the dispenser assembly 12. Such connection between the dispenser assembly 12 and the breechplate assembly 14 enables the breechplate assembly 14 to communicate with sequencer 18 provided on the platform 1 via the wiring harness 12B of dispenser assembly 12.

Prior to loading the magazine assembly 16 into the dispenser 12A of the dispenser assembly 12, the magazine 16A is loaded with the set of countermeasure expendables 20. Here, an operator of the CMDS 10 loads each countermeasure expendable of the set of countermeasure expendables 20 into a rear set of apertures defined in the magazine 16A until each countermeasure expendable of the set of countermeasure expendables 20 is fully housed inside of a respective passageway of a set of passageways defined in the magazine 16. It should be noted that additional retaining plates and/or members may be attached to the magazine 16A to keep each countermeasure expendable of the set of countermeasure expendables 20 inside of the magazine 16A.

Figure 11:
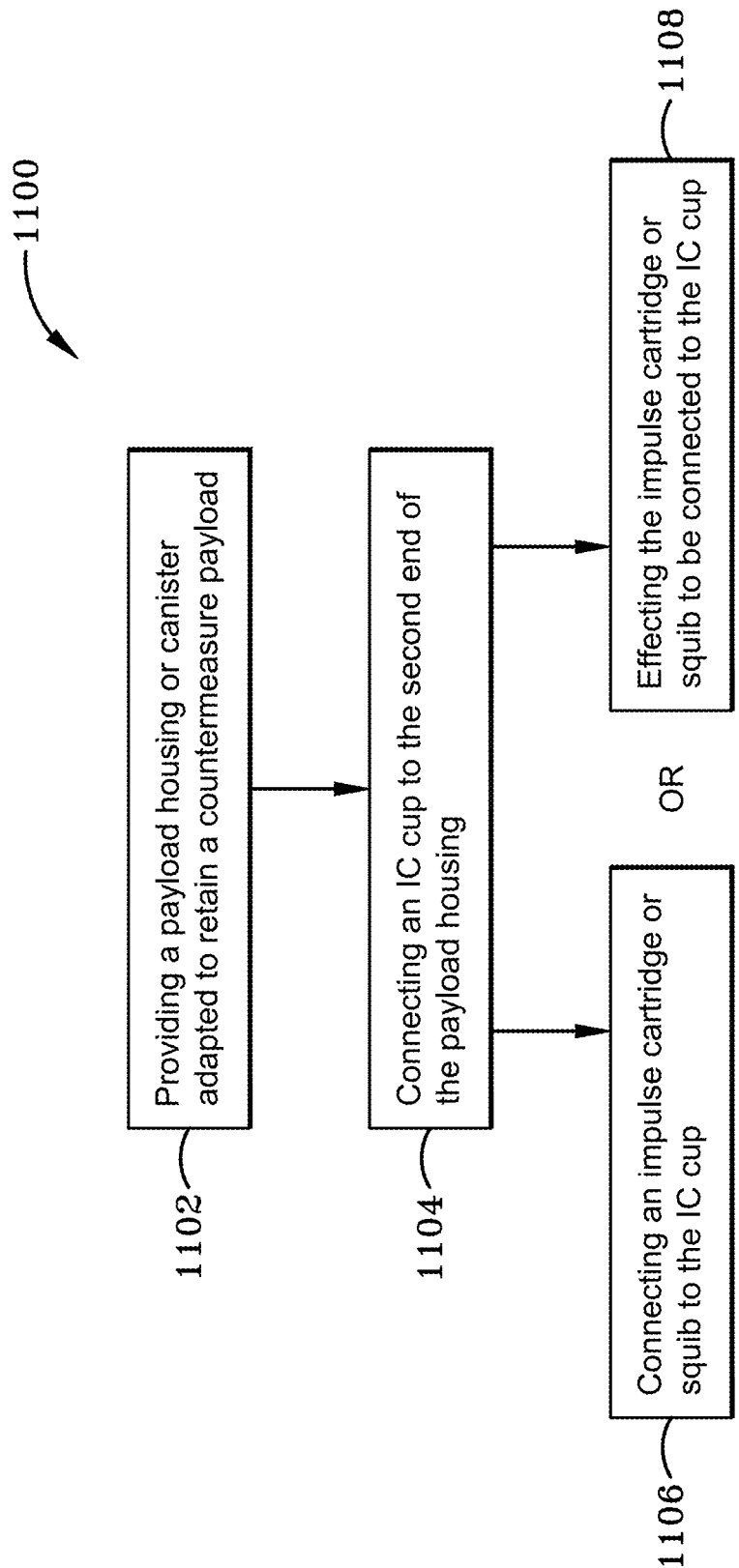
FIG. 11 is a flow chart that depicts an exemplary method of one embodiment of the present disclosure.

FIG. 11 depicts an exemplary method according to one aspect of the present disclosure, generally at 1100. Method 1100 includes providing a payload housing or canister 22 adapted to retain a countermeasure payload therein, wherein the housing or canister 22 has a first end and a second end, wherein the countermeasure payload is to be configured to deployed from the first end, which is shown generally at 1102. The method also includes connecting an IC cup to the second end of the payload housing, which is shown generally at 1104. In one embodiment, the IC cup is IC cup 30 which may include a body extending from a first end to a second end, the body having a primary axis extending from the first end to the second end; a cylindrical sidewall of the body extending between the first end and the second end, the cylindrical sidewall circumscribing the primary axis, the cylindrical sidewall having an outer surface and inner surface, wherein the inner surface defines a cavity that is adapted to receive an impulse cartridge therein, wherein at least a portion of the outer surface of the cylindrical sidewall is threaded; an endwall that defines the second end, wherein the endwall has an inner surface and an outer surface, wherein the inner surface of the endwall bounds the cavity, and the end wall intersects the primary axis, wherein the endwall is adapted to destructively open in response explosion of the impulse cartridge; a first aperture defined in the cylindrical sidewall, wherein the first aperture extends radially relative to the primary axis through the cylindrical sidewall from the inner surface to the outer surface; and a first electrical connector disposed in the first aperture, wherein the first electrical connector is adapted to physically contact the impulse cartridge at a first location. Method 1100 may further include performing one of the following steps: either connecting an impulse cartridge or squib to the IC cup, which is shown generally at 1106, or effecting the impulse cartridge or squib to be connected to the IC cup, which is shown generally at 1108.

Figure 12A:
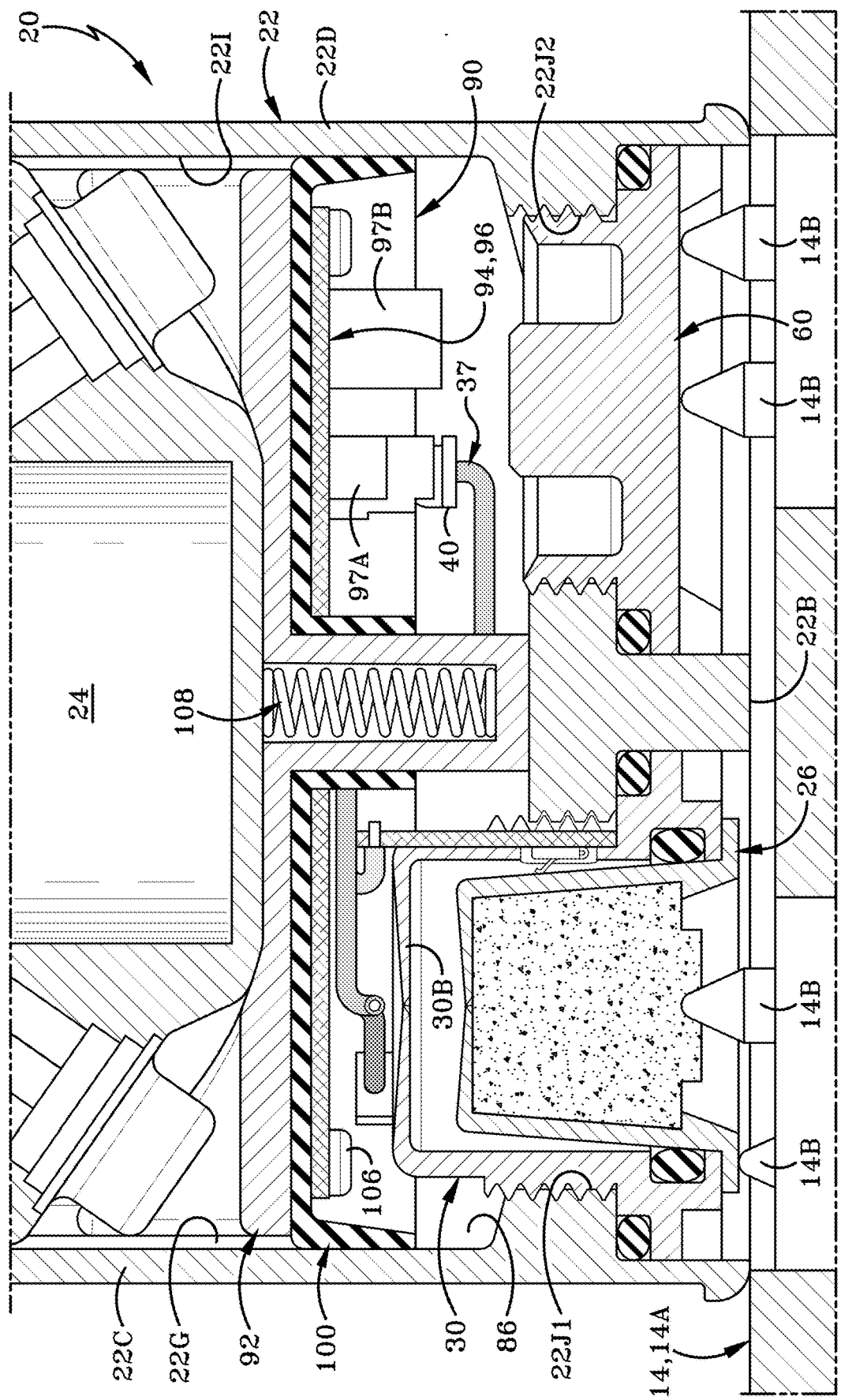
FIG. 12A is an operational cross section view with an impulse cartridge inserted into the IC cup.
Figure 12B:
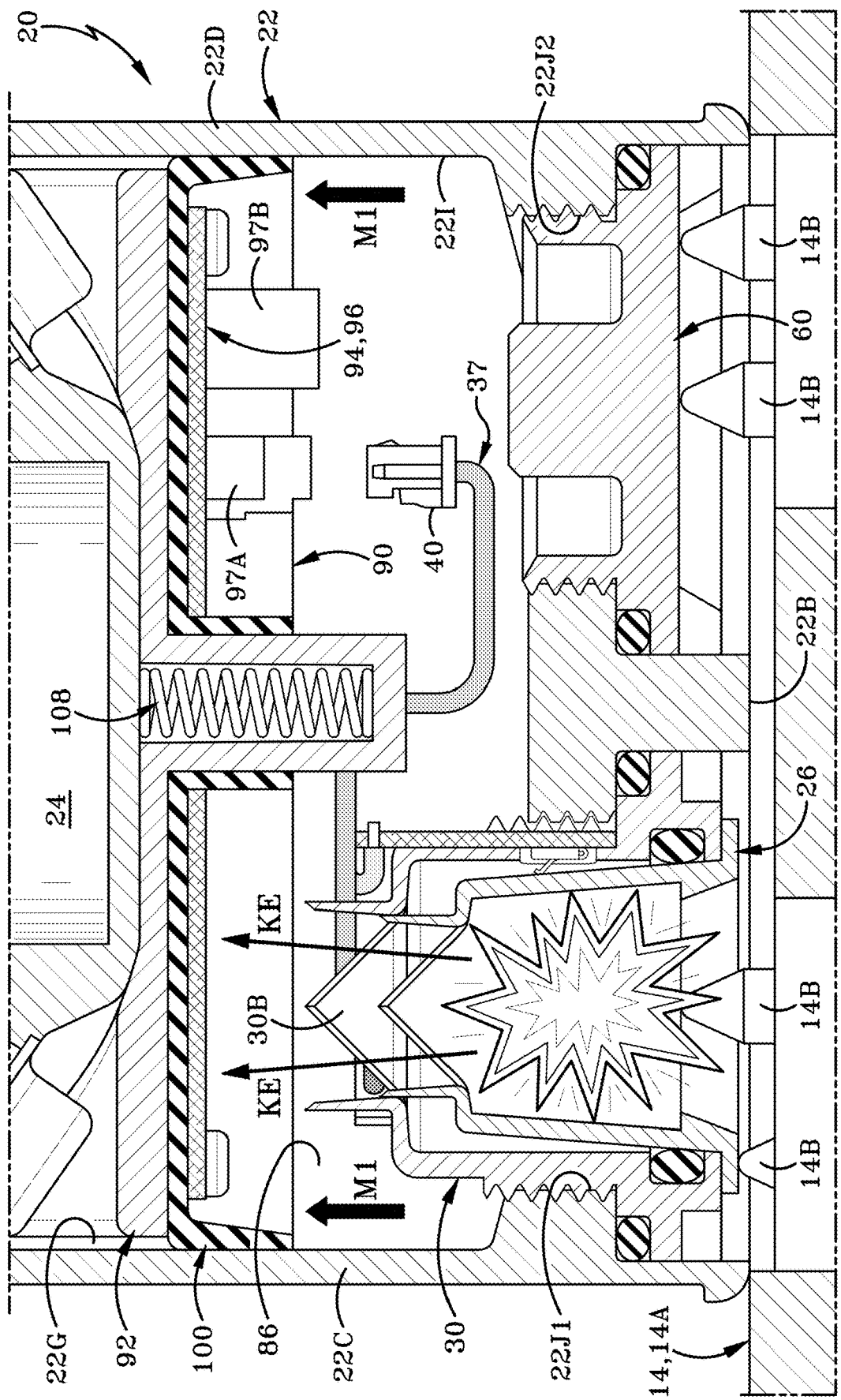
FIG. 12B is an operational cross section view of the impulse being detonated.

In operation and with respect to FIG. 12A and FIG. 12B, a squib 26 is inserted through the opening at the first end and into the cavity 30A of IC cup 30. The squib 26 is moved rearward toward the second end or endwall 30B of the body of the IC cup 30. The squib 26 is formed from a conductive material. When the squib 26 is inserted into the cavity 30A, the exterior surface of squib 26 will contact at least one of the three electrical connectors 33A-33C. In one embodiment, the exterior surface of the contacts all three electrical connectors 33A-33C simultaneously. When at least two of three connectors, such as second connector 33B and third connector 33C are contacted by the squib 26, the conductive material of the squib 26 enables a circuit to be completed between the second connector 33B and the third connector 33C. When the connectors 33A-33C are formed as bow-legged spring connectors, the tab portion on the connectors 33A-33C are biased into a contacting relationship with the exterior surface of squib 26 to ensure that the connection remains a completed circuit during the operation or deployment of the expendable.

When a circuit is completed by the electrical connection of the second connector 33B and the third connector 33C, the first connector 33A is enabled to send signal through the first wire 37A to the common connector 40 and ultimately into the payload 24. The signals sent through first connector 33A can be utilized to reprogram corresponding circuits or processors on the payload 24 or can be used as a holdup signal for the coin cell secondary battery.

The set of countermeasure expendables 20, which have squibs 26 connected to the IC cup 30, are loaded into the magazine 16A. The magazine 16A may then be loaded into the dispenser 12A of the dispenser assembly 12. Upon being loaded into the dispenser 12A, a pair of firing pins of the set of firing pin mechanisms 14B may then engage with a respective countermeasure expendable from the set of countermeasure expendables 20. The pair of firing pins the set of firing pin mechanisms 14B engages with the squib 26 and with the port plug 60 of the respective countermeasure expendable from the set of countermeasure expendables 20. The remaining pairs of firing pins of the set of firing pin mechanisms 14B also engage with the remaining countermeasure expendables from the set of countermeasure expendables 20. The operator may then operably engage the magazine 16A with the dispenser 12A such that the magazine 16A is held inside of the dispenser 12A and the platform 1. In the illustrated embodiment, the connectors 16B may be threadably engaged with the dispenser 12A to hold the magazine 16A inside of the dispenser 12A.

During a military operation, sequencer 18 may send at least one electrical signal to the breechplate assembly 14 to fire and eject at least one countermeasure expendable from the set of countermeasure expendables 20 to perform a countermeasure operation. The sequencer 18 sends at least one electrical signal to the breechplate assembly 14, particularly at least one firing pin from the set of firing pin mechanisms 14B, to ignite squib 26. Upon ignition, the squib 26 creates kinetic energy "KE" that is directed through the impulse cartridge cup 30 and towards the smart piston 90 into a combustion chamber 86 defined between the impulse cartridge cup 30 and the smart piston 90. The kinetic energy is also maintained between the impulse cartridge cup 30 and the smart piston 90 to ensure that a substantial amount of the kinetic energy is used to eject the payload 24 and the smart piston 90 from the canister 22. The kinetic energy generated by the squib 26 then collectively moves the payload 24 and the smart piston 90 through the canister 22 towards the front wall 22A away from the rear wall 22B, as indicated by arrows M1. There is a first electrical port 97A that electrically connects with an electronic circuit b board (ECB) on piston 90. First electrical port 97A enables a set of electrical connections to electrically connect the impulse cartridge cup 30 with the electronic system 94. Such first electrical port 97A enables the impulse cartridge cup 30 and the payload 24 to logically communicate with one another by passing through the smart piston 90. A second electrical port 97B electrically connects with the ECB. Second electrical port 97B enables an external computer or testing unit to electrically connect with electronic system 94 for testing purposes. Such second electrical port 97B enables a user of countermeasure expendable 20 to communicate and interface with the processing unit of the payload 24 for various testing operations. The common connector 40 is disconnected from its connection with port 97A in response to the detonation of squib 26.

Once the payload 24 and the smart piston 90 are positioned outside of the canister 22, a biaser 108 will bias the payload 24 outwardly away from the smart piston 90. Such biasing by the biaser pushes the payload 24 further away from the platform 1 to overcome external environment factors surrounding the platform 1, such as external wind gusts, lack of gravity applied against payload 24 (i.e., ejected when platform 1 is inverted), and other various external environment factors. It should be noted that the kinetic energy generated by the squib 26 may also be a suitable amount of energy for ejecting the payload 24 away from the platform 1 in addition to the biasing force applied by the biaser.

The device, assembly, or system of the present disclosure may additionally include one or more sensor to sense or gather data pertaining to the surrounding environment or operation of the device, assembly, or system. Some exemplary sensors capable of being electronically coupled with the device, assembly, or system of the present disclosure (either directly connected to the device, assembly, or system of the present disclosure or remotely connected thereto) may include but are not limited to: accelerometers sensing accelerations experienced during rotation, translation, velocity/speed, location traveled, elevation gained; gyroscopes sensing movements during angular orientation and/or rotation, and rotation; altimeters sensing barometric pressure, altitude change, terrain climbed, local pressure changes, submersion in liquid; impellers measuring the amount of fluid passing thereby; Global Positioning sensors sensing location, elevation, distance traveled, velocity/speed; audio sensors sensing local environmental sound levels, or voice detection; Photo/Light sensors sensing ambient light intensity, ambient, Day/night, UV exposure; TV/IR sensors sensing light wavelength; Temperature sensors sensing machine or motor temperature, ambient air temperature, and environmental temperature; and Moisture Sensors sensing surrounding moisture levels.

The device, assembly, or system of the present disclosure may include wireless communication logic coupled to sensors on the device, assembly, or system. The sensors gather data and provide the data to the wireless communication logic. Then, the wireless communication logic may transmit the data gathered from the sensors to a remote device. Thus, the wireless communication logic may be part of a broader communication system, in which one or several devices, assemblies, or systems of the present disclosure may be networked together to report alerts and, more generally, to be accessed and controlled remotely. Depending on the types of transceivers installed in the device, assembly, or system of the present disclosure, the system may use a variety of protocols (e.g., Wifi, ZigBee, MiWi, Bluetooth) for communication. In one example, each of the devices, assemblies, or systems of the present disclosure may have its own IP address and may communicate directly with a router or gateway. This would typically be the case if the communication protocol is WiFi.

As described herein, aspects of the present disclosure may include one or more electrical, pneumatic, hydraulic, or other similar secondary components and/or systems therein. The present disclosure is therefore contemplated and will be understood to include any necessary operational components thereof. For example, electrical components will be understood to include any suitable and necessary wiring, fuses, or the like for normal operation thereof. Similarly, any pneumatic systems provided may include any secondary or peripheral components such as air hoses, compressors, valves, meters, or the like. It will be further understood that any connections between various components not explicitly described herein may be made through any suitable means including mechanical fasteners, or more permanent attachment means, such as welding or the like. Alternatively, where feasible and/or desirable, various components of the present disclosure may be integrally formed as a single unit.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of technology disclosed herein may be implemented using hardware, software, or a combination thereof. When implemented in software, the software code or instructions can be executed on any suitable processor or collection of processors, whether provided in a single computer or distributed among multiple computers. Furthermore, the instructions or software code can be stored in at least one non-transitory computer readable storage medium.

Also, a computer or smartphone may be utilized to execute the software code or instructions via its processors may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers or smartphones may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software/instructions that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, USB flash drives, SD cards, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the disclosure discussed above. The computer readable medium or media can be transportable, such that the program or programs stored thereon can be loaded onto one or more different computers or other processors to implement various aspects of the present disclosure as discussed above.

The terms "program" or "software" or "instructions" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments. As such, one aspect or embodiment of the present disclosure may be a computer program product including least one non-transitory computer readable storage medium in operative communication with a processor, the storage medium having instructions stored thereon that, when executed by the processor, implement a method or process described herein, wherein the instructions comprise the steps to perform the method(s) or process(es) detailed herein.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

All definitions, as defined and used herein, should be understood to control over dictionary definitions, definitions in documents incorporated by reference, and/or ordinary meanings of the defined terms.

"Logic", as used herein, includes but is not limited to hardware, firmware, software, and/or combinations of each to perform a function(s) or an action(s), and/or to cause a function or action from another logic, method, and/or system. For example, based on a desired application or needs, logic may include a software controlled microprocessor, discrete logic like a processor (e.g., microprocessor), an application specific integrated circuit (ASIC), a programmed logic device, a memory device containing instructions, an electric device having a memory, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

Furthermore, the logic(s) presented herein for accomplishing various methods of this system may be directed towards improvements in existing computer-centric or internet-centric technology that may not have previous analog versions. The logic(s) may provide specific functionality directly related to structure that addresses and resolves some problems identified herein. The logic(s) may also provide significantly more advantages to solve these problems by providing an exemplary inventive concept as specific logic structure and concordant functionality of the method and system. Furthermore, the logic(s) may also provide specific computer implemented rules that improve on existing technological processes. The logic(s) provided herein extends beyond merely gathering data, analyzing the information, and displaying the results. Further, portions or all of the present disclosure may rely on underlying equations that are derived from the specific arrangement of the equipment or components as recited herein. Thus, portions of the present disclosure as it relates to the specific arrangement of the components are not directed to abstract ideas. Furthermore, the present disclosure and the appended claims present teachings that involve more than performance of well-understood, routine, and conventional activities previously known to the industry. In some of the method or process of the present disclosure, which may incorporate some aspects of natural phenomenon, the process or method steps are additional features that are new and useful.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of"

or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

While components of the present disclosure are described herein in relation to each other, it is possible for one of the components disclosed herein to include inventive subject matter, if claimed alone or used alone. In keeping with the above example, if the disclosed embodiments teach the features of components A and B, then there may be inventive subject matter in the combination of A and B, A alone, or B alone, unless otherwise stated herein.

As used herein in the specification and in the claims, the term "effecting" or a phrase or claim element beginning with the term "effecting" should be understood to mean to cause something to happen or to bring something about. For example, effecting an event to occur may be caused by actions of a first party even though a second party actually performed the event or had the event occur to the second party. Stated otherwise, effecting refers to one party giving another party the tools, objects, or resources to cause an event to occur. Thus, in this example a claim element of "effecting an event to occur" would mean that a first party is giving a second party the tools or resources needed for the second party to perform the event, however the affirmative single action is the responsibility of the first party to provide the tools or resources to cause said event to occur.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

To the extent that the present disclosure has utilized the term "invention" in various titles or sections of this specification, this term was included as required by the formatting requirements of word document submissions pursuant the guidelines/requirements of the United States Patent and Trademark Office and shall not, in any manner, be considered a disavowal of any subject matter.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

What is claimed is:

1. An impulse cartridge (IC) cup comprising:
a body extending from a first end to a second end, the body having a primary axis extending from the first end to the second end;
a cylindrical sidewall of the body extending between the first end and the second end, the cylindrical sidewall circumscribing the primary axis, the cylindrical sidewall having an outer surface and inner surface, wherein the inner surface defines a cavity that is adapted to receive an impulse cartridge therein, wherein at least a portion of the outer surface of the cylindrical sidewall is threaded;
an endwall that defines the second end, wherein the endwall has an inner surface and an outer surface, wherein the inner surface of the endwall bounds the cavity, and the end wall intersects the primary axis, wherein the endwall is adapted to open in response explosion of the impulse cartridge;
a first aperture defined in the cylindrical sidewall, wherein the first aperture extends radially relative to the primary axis through the cylindrical sidewall from the inner surface to the outer surface; and
a first electrical connector disposed in the first aperture, wherein the first electrical connector is adapted to physically contact the impulse cartridge at a first location;
wherein the IC cup is adapted to be connected to a canister that houses a payload of a countermeasure defense system, wherein the payload is to be deployed in response to explosion of the impulse cartridge.

2. The IC cup of claim 1, further comprising:
a first transmission line; and
a common connector, wherein the first transmission line electrically couples the first electrical connector to the common connector, and the common connector is adapted to connect with a piston inside the canister.

3. The IC cup of claim 1, further comprising:
a second aperture defined in the cylindrical sidewall, wherein the second aperture extends radially relative to the primary axis through the cylindrical sidewall from the inner surface to the outer surface; and
a second electrical connector disposed in the second aperture, wherein the second electrical connector is adapted to physically contact the impulse cartridge at a second location.

4. The IC cup of claim 3, further comprising:
a third aperture defined in the cylindrical sidewall, wherein the third aperture extends radially relative to the primary axis through the cylindrical sidewall from the inner surface to the outer surface; and
a third electrical connector disposed in the third aperture, wherein the third electrical connector is adapted to physically contact the impulse cartridge at a third location.

5. The IC cup of claim 4, wherein the second aperture and the third aperture are located closer to the endwall than the first end of the body.

6. The IC cup of claim 5, further comprising:
a first transmission line coupled to the first electrical connector;
a second transmission line coupled to the second electrical connector; and
a third transmission line coupled to the third electrical connector.

7. The IC cup of claim 6, further comprising:
a common connector, wherein respective ends of the first wire or transmission line, the second wire or transmission line, and the third wire or transmission line are connected to the common connector.

8. The IC cup of claim 5, wherein the first aperture is located closer to the first end than the second aperture.

9. The IC cup of claim 5, further comprising:
a first edge that bounds and defines the first aperture;
a second edge that bounds and defines the second aperture;
a third edge that bounds and defines the third aperture;
wherein the second edge and the third edge are coplanar along a first radial plane; and
wherein the first edge lies along a second radial plane, wherein the second radial plane is closer to the first end of the body than the first radial plane.

10. The IC cup of claim 9, further comprising:
a first gap defined between a first end of the first electrical connector; and
a second gap defined between a second end of the first electrical connector.

11. The IC cup of claim 5, further comprising:
a first channel defined in the outer surface of the body, wherein the first channel has a length that extends parallel to the primary axis, and the first channel begins adjacent the second end of the body and extends toward the first end and terminates at a terminal end;

a second channel defined in the outer surface of the body, wherein the second channel has a length that extends parallel to the primary axis, and the second channel begins adjacent the second end of the body and extends toward the first end and terminates at a terminal end; and a third channel defined in the outer surface of the body, wherein the third channel has a length that extends parallel to the primary axis, and the third channel begins adjacent the second end of the body and extends toward the first end and terminates at a terminal end.

12. The IC cup of claim 11, wherein the first aperture is radially aligned with a portion of the first channel, the second aperture is radially aligned with a portion of the second channel, and the third aperture is radially aligned with a portion of the third channel.

13. The IC cup of claim 12, further comprising:
a first carrier board in the first channel, wherein the first electrical connector is connected to the first carrier board and disposed in the first aperture;
a second carrier board in the second channel, wherein the second electrical connector is connected to the second carrier board and disposed in the second aperture; and
a third carrier board in the third channel, wherein the third electrical connector is connected to the third carrier board and disposed in the third aperture.

14. The IC cup of claim 12, wherein the first channel is longer than the second channel and longer than the third channel.

15. The IC cup of claim 12, further comprising:
a depth of the first channel, wherein the depth of the first channel substantially equals a dimensional sum of a thickness of a first carrier in the first channel and a thickness of a layer of adhesive or epoxy to adhere or bond the first carrier in the first channel that is adapted to dispose an outer surface of the first carrier complementary to a nadir of at least one thread in the outer surface;
a depth of the second channel, wherein the depth of the second channel substantially equals a dimensional sum of a thickness of a second carrier in the second channel and a thickness of a layer of adhesive or epoxy to adhere or bond the second carrier in the second channel that is adapted to dispose an outer surface of the second carrier complementary to a nadir of at least one thread in the outer surface; and
a depth of the third channel, wherein the depth of the third channel substantially equals a dimensional sum of a thickness of a third carrier in the third channel and a thickness of a layer of adhesive or epoxy to adhere or bond the third carrier in the third channel that is adapted to dispose an outer surface of the third carrier complementary to a nadir of at least one thread in the outer surface.

16. The IC cup of claim 5, wherein the first electrical connector is spaced about 120° relative to the primary axis from the second electrical connector, and wherein the second electrical connector is spaced about 120° relative to the primary axis from the third electrical connector, and wherein the third electrical connector is spaced about 120° relative to the primary axis from the first electrical connector.

17. The IC cup of claim 1, wherein the first electrical connector is a bowlegged connector.

18. A method comprising:
providing a payload housing adapted to retain a countermeasure payload therein, wherein the housing has a first end and a second end, wherein the countermeasure payload is to be configured to deployed from the first end;
connecting an impulse cartridge (IC) cup to the second end of the payload housing, wherein the IC cup includes:
a body extending from a first end to a second end, the body having a primary axis extending from the first end to the second end;
a cylindrical sidewall of the body extending between the first end and the second end, the cylindrical sidewall circumscribing the primary axis, the cylindrical sidewall having an outer surface and inner surface, wherein the inner surface defines a cavity that is adapted to receive an impulse cartridge therein, wherein at least a portion of the outer surface of the cylindrical sidewall is threaded;
an endwall that defines the second end, wherein the endwall has an inner surface and an outer surface, wherein the inner surface of the endwall bounds the cavity, and the end wall intersects the primary axis, wherein the endwall is adapted to destructively open in response explosion of the impulse cartridge;
a first aperture defined in the cylindrical sidewall, wherein the first aperture extends radially relative to the primary axis through the cylindrical sidewall from the inner surface to the outer surface; and
a first electrical connector disposed in the first aperture, wherein the first electrical connector is adapted to physically contact the impulse cartridge at a first location; and
performing one of the following steps:
connecting an impulse cartridge or squib to the IC cup; or
effecting the impulse cartridge or squib to be connected to the IC cup.

* * * * *